(12) United States Patent
Hender

(10) Patent No.: US 10,766,202 B2
(45) Date of Patent: Sep. 8, 2020

(54) SYSTEM AND METHOD FOR WELDING A CHAMBER

(71) Applicant: NIKE, Inc., Beaverton, OR (US)

(72) Inventor: Heather D. Hender, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 188 days.

(21) Appl. No.: 15/977,867

(22) Filed: May 11, 2018

(65) Prior Publication Data

US 2018/0333921 A1    Nov. 22, 2018

Related U.S. Application Data

(60) Provisional application No. 62/508,057, filed on May 18, 2017.

(51) Int. Cl.
| | |
|---|---|
| *B32B 37/10* | (2006.01) |
| *B29C 65/08* | (2006.01) |
| *A43B 13/18* | (2006.01) |
| *A43B 13/12* | (2006.01) |
| *B29D 35/12* | (2010.01) |

(Continued)

(52) U.S. Cl.
CPC ............ *B29C 65/08* (2013.01); *A43B 13/023* (2013.01); *A43B 13/12* (2013.01); *A43B 13/125* (2013.01); *A43B 13/127* (2013.01); *A43B 13/181* (2013.01); *A43B 13/189* (2013.01); *A43B 13/20* (2013.01); *A43B 13/206* (2013.01); *B29C 65/04* (2013.01); *B29C 65/48* (2013.01); *B29C 66/1122* (2013.01); *B29C 66/4326* (2013.01); *B29C 66/8322* (2013.01); *B29D 35/122* (2013.01); *B29D 35/128* (2013.01); *B29D 35/142* (2013.01); *B29C 66/133* (2013.01); *B29C 66/433* (2013.01);

(Continued)

(58) Field of Classification Search
CPC ... B29C 66/433; B29C 66/438; B29C 66/439; B29C 2043/3227; B29C 2043/566
USPC .................................................. 156/145, 156
See application file for complete search history.

(56) References Cited

U.S. PATENT DOCUMENTS

| | | | | | |
|---|---|---|---|---|---|
| 3,825,457 | A | * | 7/1974 | Holroyd et al. | ........ B29C 45/02 156/147 |
| 4,028,042 | A | * | 6/1977 | Goodfellow | ............ B29C 43/04 425/515 |

(Continued)

OTHER PUBLICATIONS

European Patent Office (ISA), International Search Report and Written Opinion for International Application No. PCT/US2018/032627, dated Jul. 26, 2018.

(Continued)

*Primary Examiner* — Scott W Dodds
(74) *Attorney, Agent, or Firm* — Honigman LLP; Matthew H. Szalach; Jonathon P. O'Brien

(57) ABSTRACT

A method of forming a fluid-filled chamber for an article of footwear is provided and includes positioning a first sheet of material and a second sheet of material in a pressure chamber, increasing a fluid pressure within the pressure chamber to a first value, and coupling the first sheet of material to the second sheet of material within the pressure chamber to define a fluid-filled chamber defined by the first sheet of material and the second sheet of material and having a fluid pressure equal to the first value. The method also includes decreasing the fluid pressure within the pressure chamber to a second value.

20 Claims, 14 Drawing Sheets

(51) Int. Cl.
*A43B 13/20* (2006.01)
*A43B 13/02* (2006.01)
*B29D 35/14* (2010.01)
*B29C 65/00* (2006.01)
*B29C 65/48* (2006.01)
*B29C 65/04* (2006.01)
*B29L 31/50* (2006.01)

(52) U.S. Cl.
CPC ............ *B29C 66/439* (2013.01); *B29C 66/71* (2013.01); *B29C 66/73921* (2013.01); *B29L 2031/504* (2013.01)

(56) References Cited

U.S. PATENT DOCUMENTS

| | | | |
|---|---|---|---|
| 5,112,560 A * | 5/1992 | Moumdjian | A43B 13/203 |
| | | | 12/146 M |
| 5,976,451 A | 11/1999 | Skaja et al. | |
| 2014/0173937 A1* | 6/2014 | Smith | A43B 13/189 |
| | | | 36/102 |
| 2016/0192737 A1 | 7/2016 | Campos, II et al. | |

OTHER PUBLICATIONS

European Patent Office (ISA), International Preliminary Report on Patentability for International Application No. PCT/US2018/032627, dated Nov. 28, 2019.

* cited by examiner

SYSTEM AND METHOD FOR WELDING A CHAMBER

CROSS-REFERENCE TO RELATED APPLICATION

This application claims priority under 35 U.S.C. § 119(e) to Provisional U.S. Patent Application No. 62/508,057, filed May 18, 2017, the disclosure of which is hereby incorporated by reference in its entirety.

FIELD

The present disclosure relates generally to a system and method for forming a fluid-filled chamber, and more particularly to a system and method for welding a fluid-filled chamber under pressure.

BACKGROUND

This section provides background information related to the present disclosure and is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and may include a pressurized fluid-filled chamber that compresses resiliently under an applied load to cushion the foot by attenuating ground-reaction forces.

Fluid-filled chambers are generally formed from two polymer sheets of material that join together to define a peripheral bond of the fluid-filled chambers. A tool having upper and lower mold portions is generally used to impart a desired shape of the chamber and apply heat for joining the two polymer sheets together at the peripheral bond. A pressurized fluid is then supplied between the two polymer sheets to inflate the chamber.

While known systems and methods for manufacturing fluid-filled chambers have proven acceptable for their intended purposes, a continuous need for improvement in the relevant art remains. For example, a need exists for a system and method for manufacturing a fluid-filled chamber in a faster and less expensive manner by utilizing fewer toolsets, less expensive equipment, fewer processing steps, and a fewer operators.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
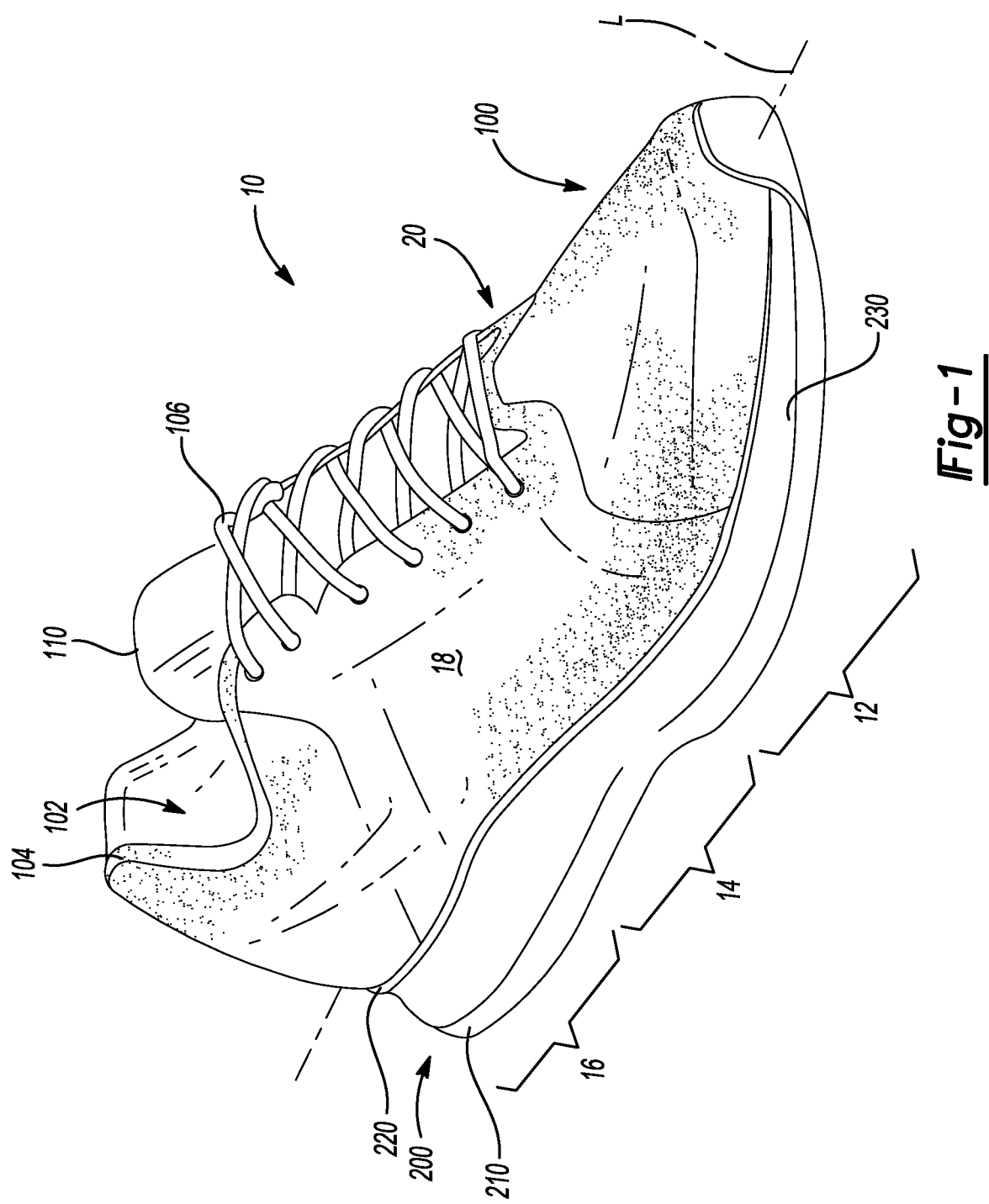
FIG. 1 is a perspective view of an article of footwear in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method of forming a fluid-filled chamber for an article of footwear. The method includes positioning a first sheet of material and a second sheet of material in a pressure chamber, increasing a fluid pressure within the pressure chamber to a first value, and coupling the first sheet of material to the second sheet of material within the pressure chamber to define a fluid-filled chamber defined by the first sheet of material and the second sheet of material and having a fluid pressure equal to the first value. The method also includes decreasing the fluid pressure within the pressure chamber to a second value.

Implementations of the disclosure may include one or more of the following optional features.

In one configuration, the coupling step occurs after the increasing step, and the decreasing step occurs after the coupling step.

Coupling the first sheet of material to the second sheet of material may include ultrasonically welding the first sheet of material to the second sheet of material. Decreasing the fluid pressure within the pressure chamber to a second value may include applying a vacuum to the pressure chamber.

The second value may be less than a value of the fluid pressure of the atmosphere surrounding the pressure chamber. In some examples, the first value may be between 2.0 atm and 5.0 atm. The first value may also be equal to 2.6 atm. The second value may be between 0.7 atm and 0.9 atm. The second value may also be equal to 0.8 atm.

In some configurations, positioning a first sheet of material in the pressure chamber includes positioning a sheet of material formed from a polymer. For example, positioning a first sheet of material formed from a polymer may include positioning a sheet of material formed from thermoplastic polyurethane. Positioning a second sheet of material in the pressure chamber may include positioning a sheet of material formed from a polymer. For example, positioning a second sheet of material formed from a polymer may include positioning a sheet of material formed from thermoplastic polyurethane.

Increasing the fluid pressure within the pressure chamber may include supplying a first fluid to the pressure chamber from a first fluid source. Supplying a first fluid to the pressure chamber may also include supplying nitrogen. The method may also include decreasing the fluid pressure within the pressure chamber. For example, the method may include removing the first fluid from the pressure chamber with the first fluid source. Removing the first fluid from the pressure chamber with the first fluid source may include directing the removed first fluid to a bellows of the first fluid source.

In some examples, the method includes increasing the fluid pressure within the pressure chamber to a third value after decreasing the fluid pressure within the pressure chamber to the second value. The third value may be less than or equal to a value of the fluid pressure of the atmosphere surrounding the pressure chamber. The third value may also be between 0.9 atm and 1.5 atm. The third value may also be equal to 1.0 atm.

Increasing the fluid pressure within the pressure chamber to the third value may include supplying a second fluid to the pressure chamber from a second fluid source. Supplying a second fluid to the pressure chamber from a second fluid source may include supplying air. Supplying a second fluid to the pressure chamber from a second fluid source may include supplying fluid from the atmosphere surrounding the pressure chamber. The method may include providing the second fluid source with a bellows. Increasing the fluid pressure within the pressure chamber to the third value may include exposing the fluid within the pressure chamber to the atmosphere surrounding the pressure chamber.

In another aspect of the disclosure, a method of forming a fluid-filled chamber for an article of footwear is provided and includes positioning a first sheet of material in a pressure chamber, pressurizing the pressure chamber to a fluid pressure equal to a first value, and forming a fluid-filled chamber from the first sheet of material, whereby the fluid-filled chamber has a fluid pressure equal to the first value. The method further includes depressurizing the chamber to reduce the fluid pressure within the pressure chamber to a second value.

Implementations of the disclosure may include one or more of the following optional features.

In some implementations, the method includes positioning a second sheet of material in the pressure chamber. In this configuration, forming the fluid-filled chamber from the first sheet of material may include coupling the first sheet of material to the second sheet of material such that the first sheet of material and the second sheet of material collectively define the fluid-filled chamber. Forming the fluid-filled chamber may include ultrasonically welding the first sheet of material to the second sheet of material.

In some configurations, the forming step occurs after the pressurizing step, and the depressurizing step occurs after the forming step. The method may additionally include forming the fluid-filled chamber by ultrasonically welding a first portion of the first sheet of material to a second portion of the first sheet of material. Depressurizing the pressure chamber may include applying a vacuum to the pressure chamber.

In some examples, the second value may be less than a value of the fluid pressure of the atmosphere surrounding the pressure chamber. The first value may be between 2.0 atm and 5.0 atm. The first value may also be equal to 2.6 atm. The second value may be between 0.7 atm and 0.9 atm. The second value may also be equal to 0.8 atm.

Positioning a first sheet of material in the pressure chamber may include positioning a sheet of material formed from a polymer. For example, positioning a first sheet of material formed from a polymer may include positioning a sheet of material formed from thermoplastic polyurethane.

In some configurations, pressurizing the pressure chamber may include supplying a first fluid to the pressure chamber from a first fluid source. For example, supplying a first fluid to the pressure chamber may include supplying nitrogen. Depressurizing the pressure chamber may include removing the first fluid from the pressure chamber with the first fluid source. Removing the first fluid from the pressure chamber with the first fluid source may include directing the removed first fluid to a bellows of the first fluid source.

The method may also include pressurizing the pressure chamber such that the fluid pressure within the pressure chamber is equal to a third value after depressurizing the pressure chamber. The third value may be less than or equal to a value of the fluid pressure of the atmosphere surrounding the pressure chamber. The third value may be between 0.9 atm and 1.5 atm. The third value may also equal to 1.0 atm.

In some examples, pressurizing the pressure chamber may include supplying a second fluid to the pressure chamber from a second fluid source. For example, supplying a second fluid to the pressure chamber from a second fluid source may include supplying air. Supplying a second fluid to the pressure chamber from a second fluid source may also include supplying fluid from the atmosphere surrounding the pressure chamber. Supplying a second fluid to the pressure chamber may include providing the second fluid source with a bellows. Pressurizing the pressure chamber may also include exposing the fluid within the pressure chamber to the atmosphere surrounding the pressure chamber.

In yet another aspect of the disclosure, a method of forming a fluid-filled chamber for an article of footwear is provided. The method includes positioning a sheet of material in a pressure chamber, pressurizing the pressure chamber to a first pressure value, and coupling a first portion of the sheet of material to a second portion of the sheet of material to define a fluid-filled chamber having a second pressure value. The method may also include depressurizing the pressure chamber to a third pressure value less than the first pressure value and increasing the volume of the fluid-filled chamber.

In some examples, the second pressure value may be equal to the first pressure value. Increasing the volume of the fluid-filled chamber may include reducing the second pressure value. Pressurizing the pressure chamber to the first pressure may include supplying a first fluid to the pressure chamber. The third pressure value may be less than a pressure value of the atmosphere surrounding the pressure chamber. The method may also include depressurizing the pressure chamber to a fourth pressure value greater than the third pressure value and less than the first pressure value.

In some configurations, coupling the first portion of the sheet of material to the second portion of the sheet of material includes ultrasonically welding the first portion of the sheet of material to the second portion of the sheet of material.

Another aspect of the disclosure provides system for forming a fluid-filled chamber for an article of footwear. The system includes a pressure chamber having a volume of fluid, a welding device disposed within the chamber, and a first fluid source in fluid communication with the pressure chamber and operable to supply a first fluid to the volume to increase the fluid pressure of the volume.

In some examples first fluid source may include a bellows. The first fluid source may be operable to remove the first fluid from the volume and to decrease the fluid pressure of the volume. The system may also include a second fluid source in fluid communication with the pressure chamber and operable to supply a second fluid to the volume and to increase the fluid pressure of the volume. The second fluid source may include a bellows. In some examples, the first fluid is nitrogen and the second fluid is air.

The details of one or more implementations of the disclosure are set forth in the accompanying drawings and the description below. Other aspects, features, and advantages will be apparent from the description, the drawings, and the claims.

Figure 2:
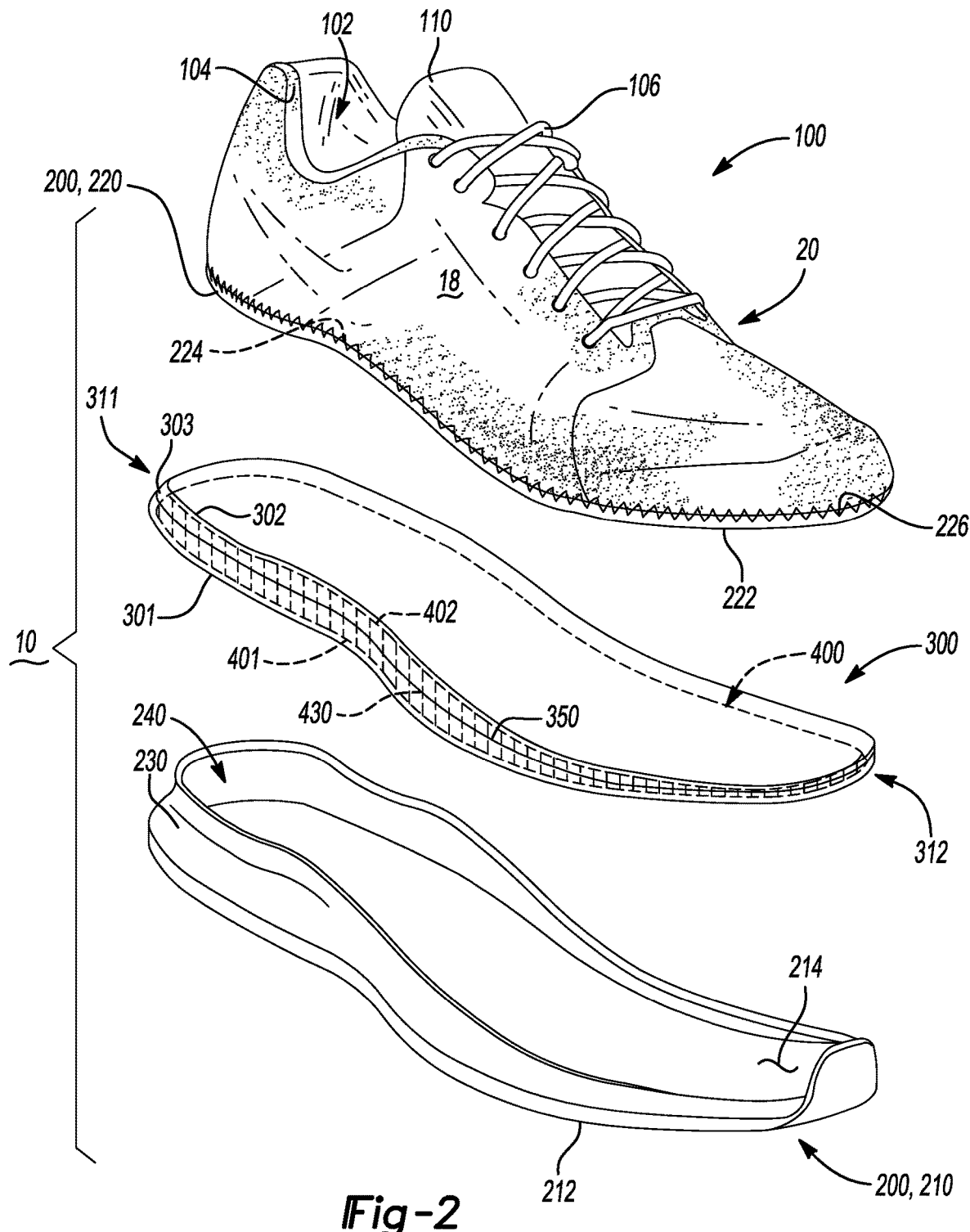
FIG. 2 is an exploded view of the article of footwear of FIG. 1 showing a fluid-filled chamber incorporating a tensile element received within a cavity between an inner surface of an outsole and a bottom surface of a strobel.

Referring to FIGS. 1 and 2, an article of footwear 10 is provided and includes an upper 100 and a sole structure 200 attached to the upper 100. The article of footwear 10 may be divided into one or more portions. The portions may include a forefoot portion 12, a midfoot portion 14, and a heel portion 16. The forefoot portion 12 may correspond with toes and joints connecting metatarsal bones with phalanx bones of a foot. The midfoot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 that receives and secures a foot for support on the sole structure 200. An ankle opening 104 in the heel portion 16 may provide access to the interior void 102. For example, the ankle opening 104 may receive a foot to secure the foot within the void 102 and facilitate entry and removal of the foot to and from the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210 and a midsole 220 arranged in a layered configuration. The sole structure 200 (e.g., the outsole 210 and the midsole 220) defines a longitudinal axis L. For example, the outsole 210 engages with a ground surface during use of the article of footwear 10 and the midsole 220 is disposed between the upper 100 and the outsole 210. In some examples, the sole structure 200 may also incorporate additional layers such as an insole or sockliner (neither shown), which may reside within the interior void 102 of the upper 100 to receive a plantar surface of the foot to enhance the comfort of the footwear 10. In some examples, a sidewall 230 surrounds a perimeter of the outsole 210 and separates the outsole 210 and the midsole 220 to define a cavity 240 therebetween.

In some configurations, the cavity 240 receives a fluid-filled chamber 300 filled with a pressurized fluid such as air, nitrogen, helium, sulfur, hexafluoride, or liquids/gels to enhance cushioning characteristics of the footwear 10 in response to ground-reaction forces. The fluid-filled chamber 300 defines an interior cavity that receives the pressurized fluid while providing a durable sealed barrier for retaining the pressurized fluid therein. The chamber 300 may be formed from a first polymer sheet 301 that opposes the outsole 210 and a second polymer sheet 302 disposed on an opposite side of the chamber 300 than the first polymer sheet 301 and opposing the midsole 220. In an example, the first and second polymer sheets 301, 302 may be formed from a thermoplastic polyurethane (TPU) polymer.

The first polymer sheet 301 may join to the second polymer sheet 302 to define a peripheral bond 350 (FIG. 2) of the chamber 300. Here, the peripheral bond 350 defines a predetermined area associated with the interior cavity that receives and retains the pressurized fluid therein. Accordingly, the peripheral bond 350 forms a sidewall 303 that extends around the periphery of the chamber 300 to connect the first polymer sheet 301 to the second polymer sheet 302.

In some configurations, the interior cavity of the fluid-filled chamber 300 also receives a tensile element 400 having a lower tensile layer 401 that attaches to first polymer sheet 301, an upper tensile layer 402 that attaches to the second polymer sheet 302, and a plurality of tensile elements 430 that extend between and connect the lower and upper tensile layers 401 and 402, respectively, of the tensile element 400. Thermobonding or another suitable fastening process (e.g., ultrasonic or radio frequency (RF) welding) may be used to secure the tensile element 400 to the chamber 300. The tensile element 400 is operative to prevent the chamber 300 from expanding outward or otherwise distending due to the pressure of the fluid within the internal cavity of the chamber 300. Namely, the tensile element 400 may limit expansion of the chamber 300 when under pressure to retain an intended shape of surfaces of the polymer sheets 301 and 302.

The chamber 300 may define a length that extends substantially parallel to the longitudinal axis L of the sole structure 200 and may be formed to provide contours that conform to a profile of the bottom surface of the foot as well as an inner surface 214 of the outsole 210. In some configurations, the chamber 300 defines a length that only extends through a portion of the length of the sole structure 200. For instance, the chamber 300 may reside in the heel portion 16 of the sole structure 200 to provide cushioning for the heel of the foot. Additionally or alternatively, two or more chambers 300 may reside in the sole structure 200 each defining a length that extends along a portion of the length of the sole structure 200. In other configurations, two or more chambers 300 may be layered upon one another that react differently in response to ground-reaction forces to provide gradient cushioning for the foot. While the sole structure 200 may include more than one chamber 300, the sole structure 200 will be described and shown as including a single chamber 300 that extends along the longitudinal axis L from the forefoot portion 12 to the heel portion 16.

The outsole 210 may include a ground-engaging surface 212 and the opposite inner surface 214. The outsole 210 may attach to the upper 100. In some examples, the sidewall 230 extends from the perimeter of the outsole 210 and attaches to the midsole 220 or the upper 100. The example of FIG. 1 shows the outsole 210 attaching to the upper 100 proximate to a tip of the forefoot portion 12. The outsole 210 generally provides abrasion-resistance and traction with the ground surface during use of the article of footwear 10. The outsole 210 may be formed from one or more materials that impart durability and wear-resistance, as well as enhance traction with the ground surface. For example, rubber may form at least a portion of the outsole 210.

The midsole 220 may include a bottom surface 222 and a footbed 224 disposed on an opposite side of the midsole 220 than the bottom surface 222. Stitching 226 or adhesives may secure the midsole 220 to the upper 100. The footbed 224 may be contoured to conform to a profile of the bottom surface (e.g., plantar) of the foot. The bottom surface 222 may oppose the inner surface 214 of the outsole 210 to define the cavity 240 therebetween. The midsole 220 may be formed from a flexible material that allows the midsole 220 to conform to the fluid-filled chamber 300 residing in the cavity 240 underneath the midsole 220. In so doing, the flexible midsole 220 may correspond to a flexible stroble that allows the pressurized fluid retained by the fluid-filled chamber 300 within in the cavity 240 to interact with the profile of the bottom surface of a foot during gradient loading of the sole structure 200. In some examples, the sidewall 230 may define a perimeter of the cavity 240 as well as a depth of the cavity 240 based on a length of separation between the bottom surface 222 and the inner surface 214. One or more polymer foam materials may form the sidewall 230 to provide resilient compressibility under applied loads to attenuate ground-reaction forces.

FIG. 2 provides an exploded view of the article of footwear 10 showing the fluid-filled chamber 300 retaining the pressurized fluid (e.g., air), the inner surface 214 of the outsole 210, and the bottom surface 222 of the midsole 220. The length of the chamber 300 may extend between a first end 311 and a second end 312. The first end 311 may be disposed proximate to the heel portion 16 of the sole structure 200 and the second end 312 may be disposed proximate to the forefoot portion 12 of the sole structure 200. The chamber 300 may also include a thickness extending substantially perpendicular to the longitudinal axis L of the sole structure 200 and a width extending between the lateral side 18 and the medial side 20. Accordingly, the length, the width, and the thickness of the chamber 300 may substantially occupy the cavity 240 defined by the inner surface 214 and the bottom surface 222 and may extend through the forefoot, midfoot, and heel portions 12, 14, 16, respectively, of the outsole 210.

Figure 3:
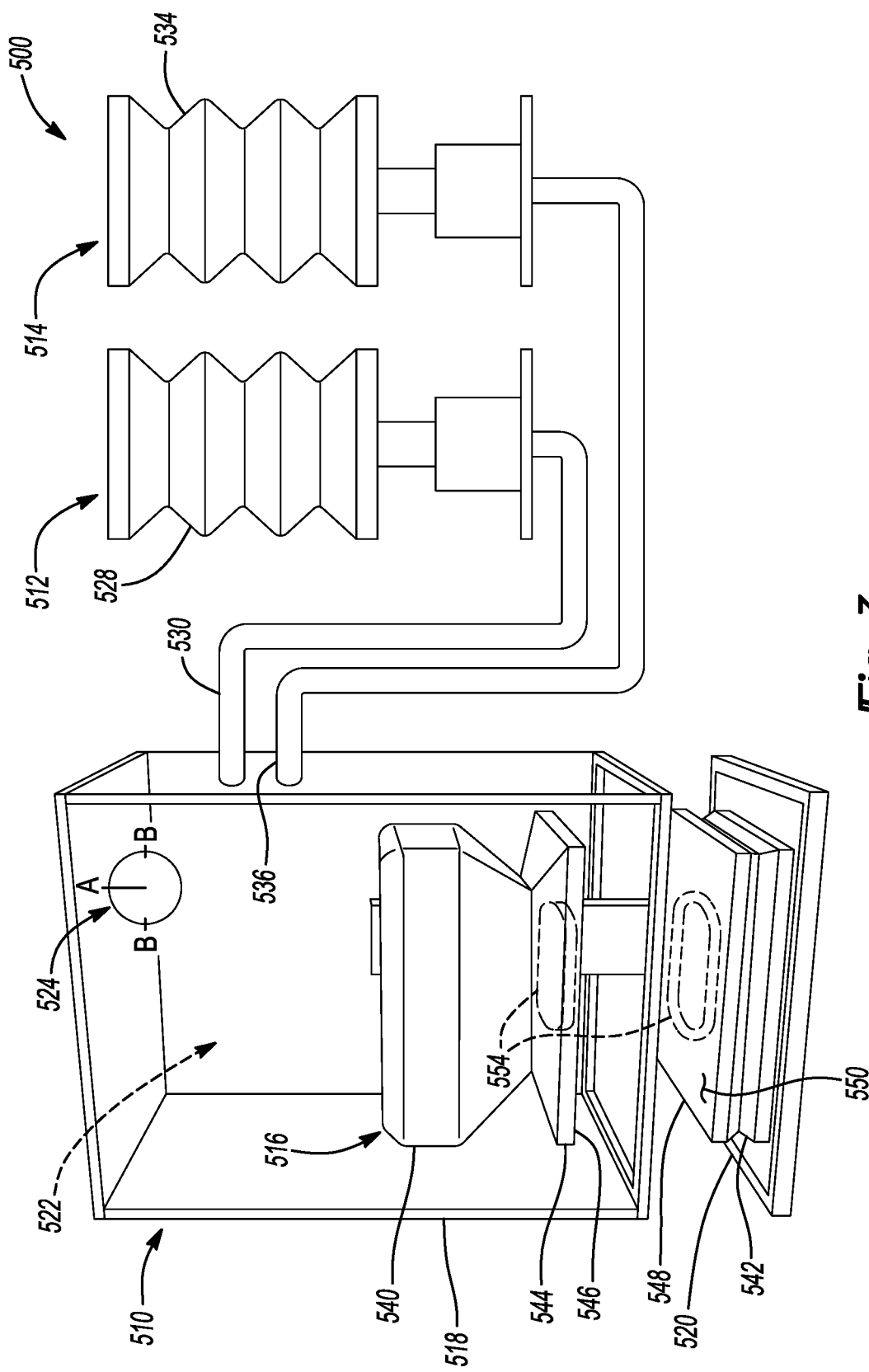
FIG. 3 is a perspective view of a system for forming a fluid-filled chamber in accordance with the principles of the present disclosure.

Referring to FIG. 3, a system 500 for use in manufacturing the fluid-filled chamber 300 (FIG. 2) is shown. It will be appreciated that, while the system 500 is generally described herein as forming the fluid-filled chamber 300 of the article of footwear 10, the system 500 may also be utilized to form a fluid-filled chamber for use in other implementations and configurations within the scope of the present disclosure.

The system 500 may include a housing 510, a first fluid supply system 512, a second fluid supply system 514, and a press 516. The housing 510 may include a primary or upper portion 518 and a secondary or lower portion 520. As will be described in more detail below, during operation, the upper portion 518 may mate with the lower portion 520 such that the housing 510 defines an inner chamber 522. In some implementations, the upper portion 518 may sealingly engage the lower portion 520 such that the chamber 522 is air-tight or otherwise operable to maintain a pressurized volume of fluid (e.g., air or other gas) within the chamber 522. In this regard, the system 500 (e.g., the housing 510) may include a pressure gauge 524 to measure and/or display the pressure of the volume of fluid within the chamber 522. Accordingly, the chamber 522 may be referred to herein as the "pressure chamber 522."

The first fluid supply system 512 may be in fluid communication with the housing 510. In particular, the first fluid supply system 512 may be in fluid communication with the chamber 522. For example, the first fluid supply system 512 may include a first fluid source 528 and a first fluid conduit 530. The first fluid conduit 530 may allow fluid communication between the first fluid source 528 and the chamber 522. Accordingly, during operation of the system 500, the first fluid conduit 530 may deliver a first fluid from the first fluid source 528 to the chamber 522, or from the chamber 522 to the first fluid source 528. In some implementations, the first fluid may include nitrogen or another suitable gas or mixture of gases.

The first fluid source 528 may include a tank, a pump, a bellows, or any other suitable arrangement for delivering the first fluid to the chamber 522. For example, as will be described in more detail below, in some implementations the first fluid source 528 includes a bellows that delivers the first fluid to the chamber 522 in a first mode of operation, and removes the first fluid from the chamber 522 in a second mode of operation.

The second fluid supply system 514 may be in fluid communication with the housing 510. In particular, the second fluid supply system 514 may be in fluid communication with the chamber 522. For example, the second fluid supply system 514 may include a second fluid source 534 and a second fluid conduit 536. The second fluid conduit 536 may allow fluid communication between the second fluid source 534 and the chamber 522. Accordingly, during operation of the system 500, the second fluid conduit 536 may deliver a second fluid from the second fluid source 534 to the chamber 522, or from the chamber 522 to the second fluid source 534. In some implementations, the first fluid may include atmospheric air or another suitable gas or mixture of gases.

The second fluid source 534 may include a tank, a pump, a bellows, or any other suitable arrangement for delivering the second fluid to the chamber 522. For example, as will be described in more detail below, in some implementations the second fluid source 534 includes a bellows that delivers the first fluid to the chamber 522 in a first mode of operation, and removes the first fluid from the chamber 522 in a second mode of operation.

The press 516 may include a top section 540 and a base section 542. The top section 540 may include an upper platen 544 having a substantially flat (e.g., planar) first surface 546, and the base section 542 may include a lower platen 548 having a substantially flat (e.g., planar) second surface 550. The upper platen 544 may be reciprocally movable relative to the lower platen 548 to operate the press 516 between an open position (e.g., FIG. 3), when the upper platen 544 is furthest away from the lower platen 548, and a closed position (e.g., FIG. 5D), when the upper platen 544 is vertically aligned with, and proximate to, the lower platen 548 such that the first surface 546 and the second surface 550 are opposing, and in some instances, contacting, one another.

One or both of the upper and lower platens 544 and 548 may move (e.g., translate and/or pivot) relative to one another between the open and closed positions in a fully automated manner through the use of one or more actuating mechanisms (none shown). For example, in some implementations, the lower platen 548 is fixed and the upper platen 544 translates toward the lower platen 548 to close the press 516 and thereby secure a first polymer sheet (e.g., first polymer sheet 301) to a second polymer sheet (e.g., the second polymer sheet 302). In other examples, the lower platen 548 and the upper platen 544 may each translate toward one another, or only the lower platen 548 may translate toward the upper platen 544.

Securing the first polymer sheet 301 to the second polymer sheet 302 to form the peripheral bond 350 may be accomplished by heating, ultrasonically welding, RF welding, or otherwise applying an adhesive to the first polymer sheet 301 or the second polymer sheet 302, such that the first polymer sheet 301 is melted, melded, bonded, adhered or otherwise secured or connected to the second polymer sheet 302 in a substantially airtight or sealed manner. For example, as illustrated in FIG. 3, the upper platen 544 or lower platen 548 may include one or more heating elements 554 disposed therein that selectively raise a temperature of the first surface 546 and/or the second surface 550, respectively.

As will be described in more detail below, while in the closed position, in some implementations, the first and second surfaces 546 and 550 may apply sufficient heat and/or pressure for joining the first and second polymer sheets 301 and 302 together and, thus, defining the peripheral bond 350 of the fluid-filled chamber 300. In some implementations, the first and second surfaces 546 and 550 may ultrasonically or RF weld the first polymer sheet 301 to the second polymer sheet 302 at the peripheral bond 350. In some implementations, the first and second surfaces 546 and 550 may cause the first polymer sheet 301 to bond to the second polymer sheet 302 in another manner.

Figure 4:
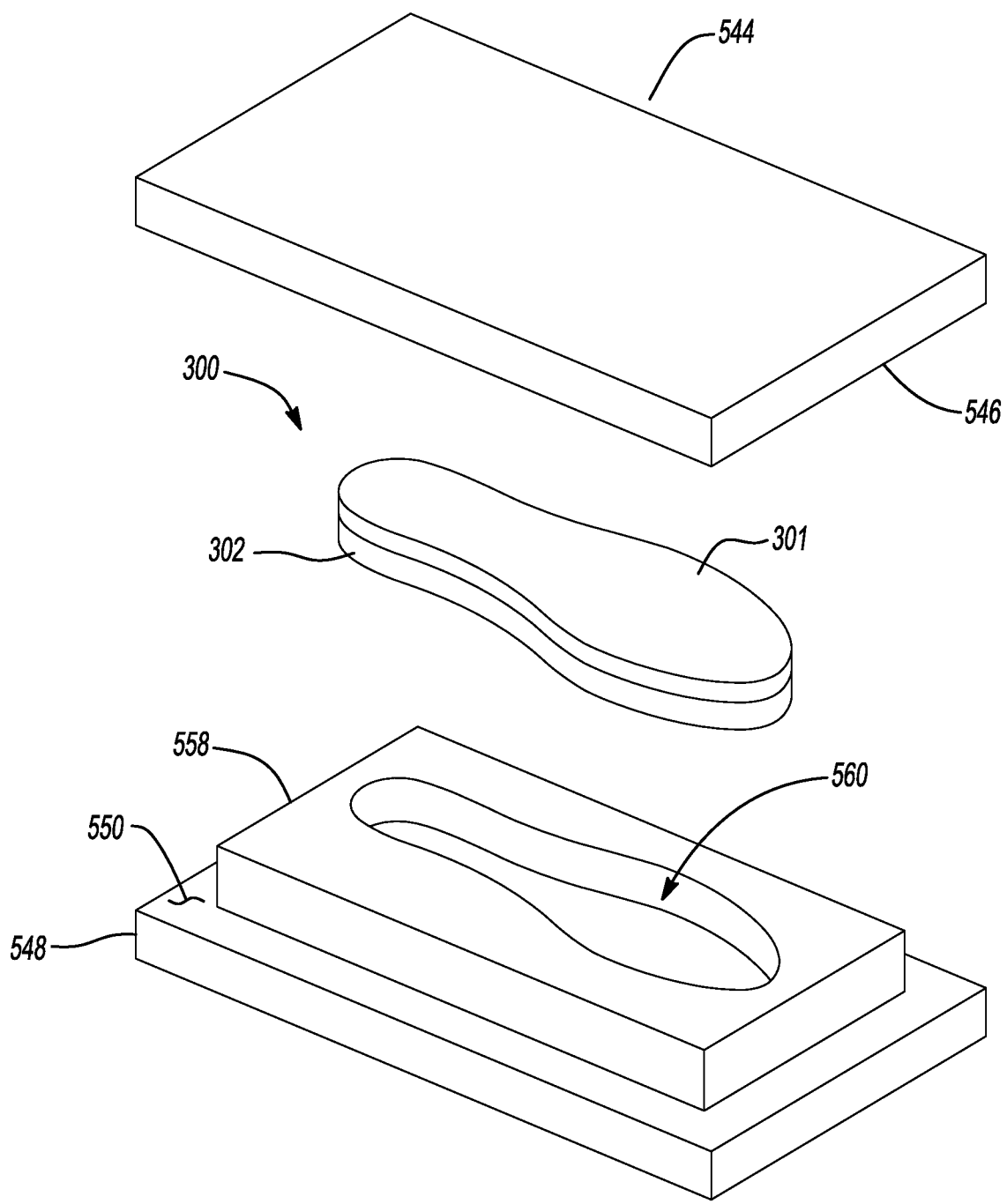
FIG. 4 is a schematic view of upper and lower platens of a system for forming a fluid-filled chamber showing a jig defining an interior void in accordance with principles of the present disclosure.

In some configurations, the tensile element 400 defines a predetermined area 556 (FIG. 5A) and is operative to maintain a gap G between the polymer sheets 301 and 302 at the predetermined area 556 such that the sheets 301 and 302 only join together at locations outside of the predetermined area 556. With reference to FIG. 4, in other configurations, a jig 558 is positioned between the first surface 546 and the first polymer sheet 301 or between the second surface 550 and the second polymer sheet 302, and the gap G between the sheets 301 and 302 is maintained within an interior void 560 defined by the jig 558.

Referring to FIGS. 5A-5G, schematic views of the system 500 of FIG. 3 are provided and include the housing 510 (e.g. the upper portion 518 and the lower portion 520) and the press 516 (e.g., the lower platen 548 and the upper platen 544) operable between opened (e.g., FIG. 5A) and closed (e.g., FIG. 5D) positions for joining the first polymer sheet 301 to the second polymer sheet 302 to define the peripheral bond 350 of the fluid-filled chamber 300. As set forth above, once formed, the fluid-filled chamber 300 (e.g., FIG. 5G) may be incorporated into the article of footwear 10 of FIGS. 1 and 2. It will be appreciated, however, that the fluid-filled chamber 300 may be incorporated into other assemblies within the scope of the present disclosure.

Figure 5A:
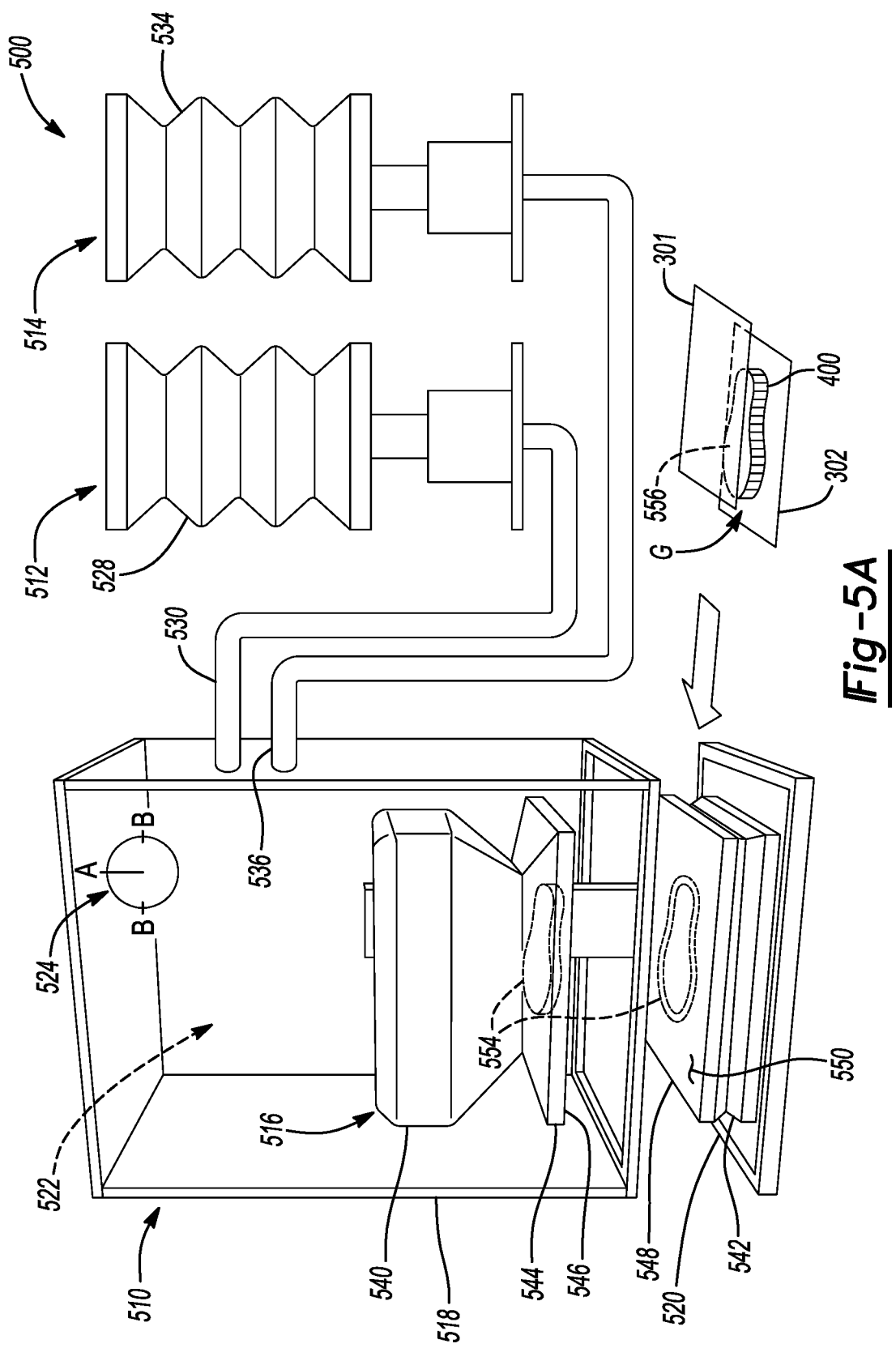
FIG. 5A is a perspective view of the system of FIG. 3 in a first mode of operation.

FIG. 5A shows the system 500 in a first mode of operation, during which (i) the upper portion 518 of the housing 510 is in an open position relative to the lower portion 520 of the housing 510, and (ii) the upper platen 544 of the press 516 is in an open position relative to the lower platen 548 of the press 516. During the first mode of operation, the pressure of the fluid inside the chamber 522 may equal the pressure of the fluid outside the chamber 522. In this regard, the pressure gauge 524 may measure the value of the pressure of the fluid inside the chamber 522 to be substantially equal to the value of the atmospheric pressure of the atmosphere surrounding the housing 510.

Figure 5B:
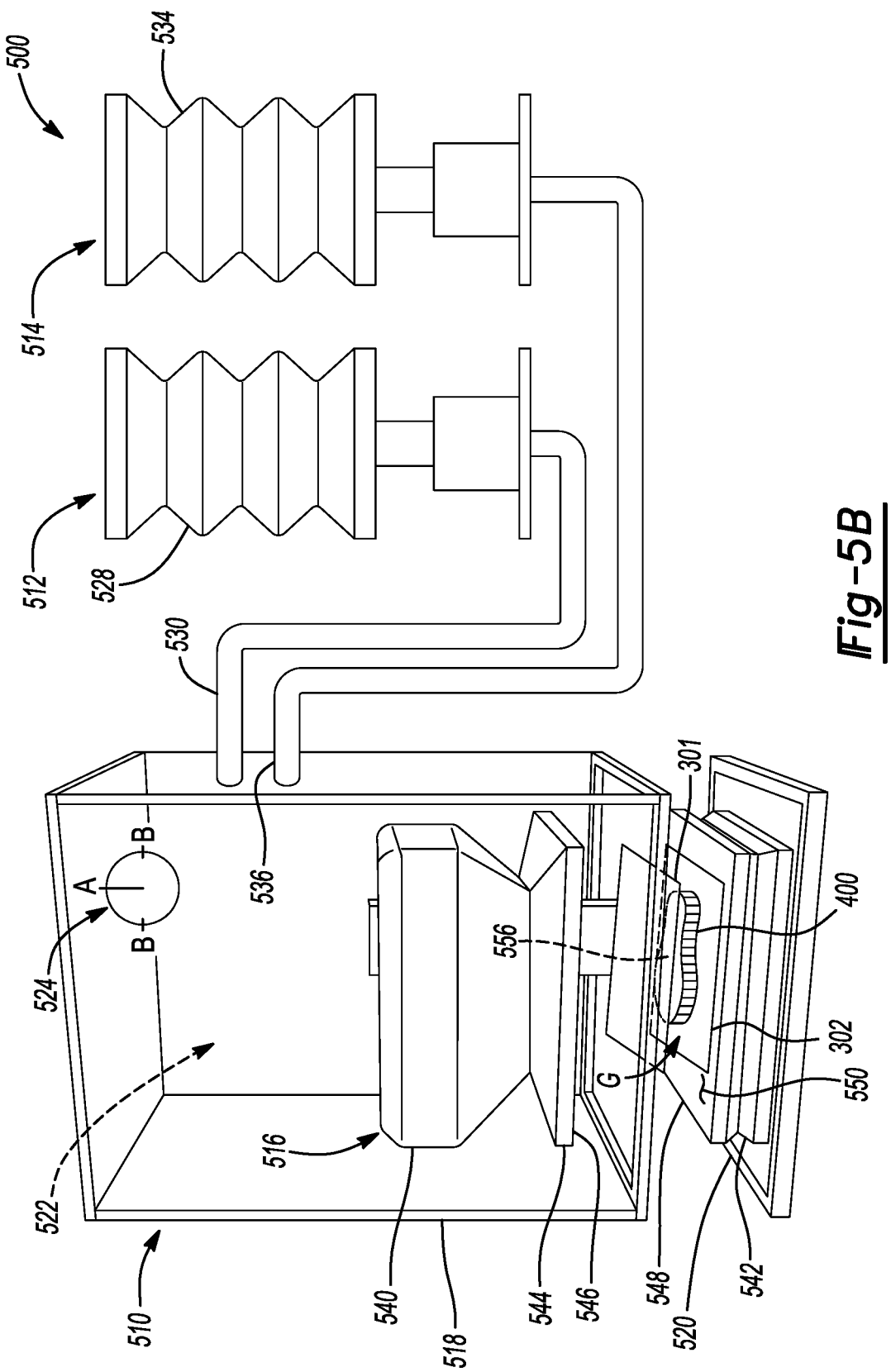
FIG. 5B is a perspective view of the system of FIG. 3 in a second mode of operation.

FIG. 5B shows the system 500 in a second mode of operation, during which (i) the upper portion 518 of the housing 510 is in the open position relative to the lower portion 520 of the housing 510, (ii) the upper platen 544 of the press 516 is in the open position relative to the lower platen 548 of the press 516, (iii) the first polymer sheet 301 is positioned on or adjacent to the second surface 550 of the lower platen 548, (iv) the second polymer sheet 302 is positioned on or adjacent to the first polymer sheet 301, and (v) the tensile element 400 is disposed between the first polymer sheet 301 and the second polymer sheet 302. In this regard, the tensile element 400 may maintain the gap G between the first polymer sheet 301 and the second polymer sheet 302 at the predetermined area 340 such that the first polymer sheet 301 and the second polymer sheet 302 are prevented from joining, or otherwise bonding, to one another at locations within the predetermined area 340. As previously described, in other implementations, the gap G may be maintained utilizing other techniques, such as the jig 558.

Figure 5C:
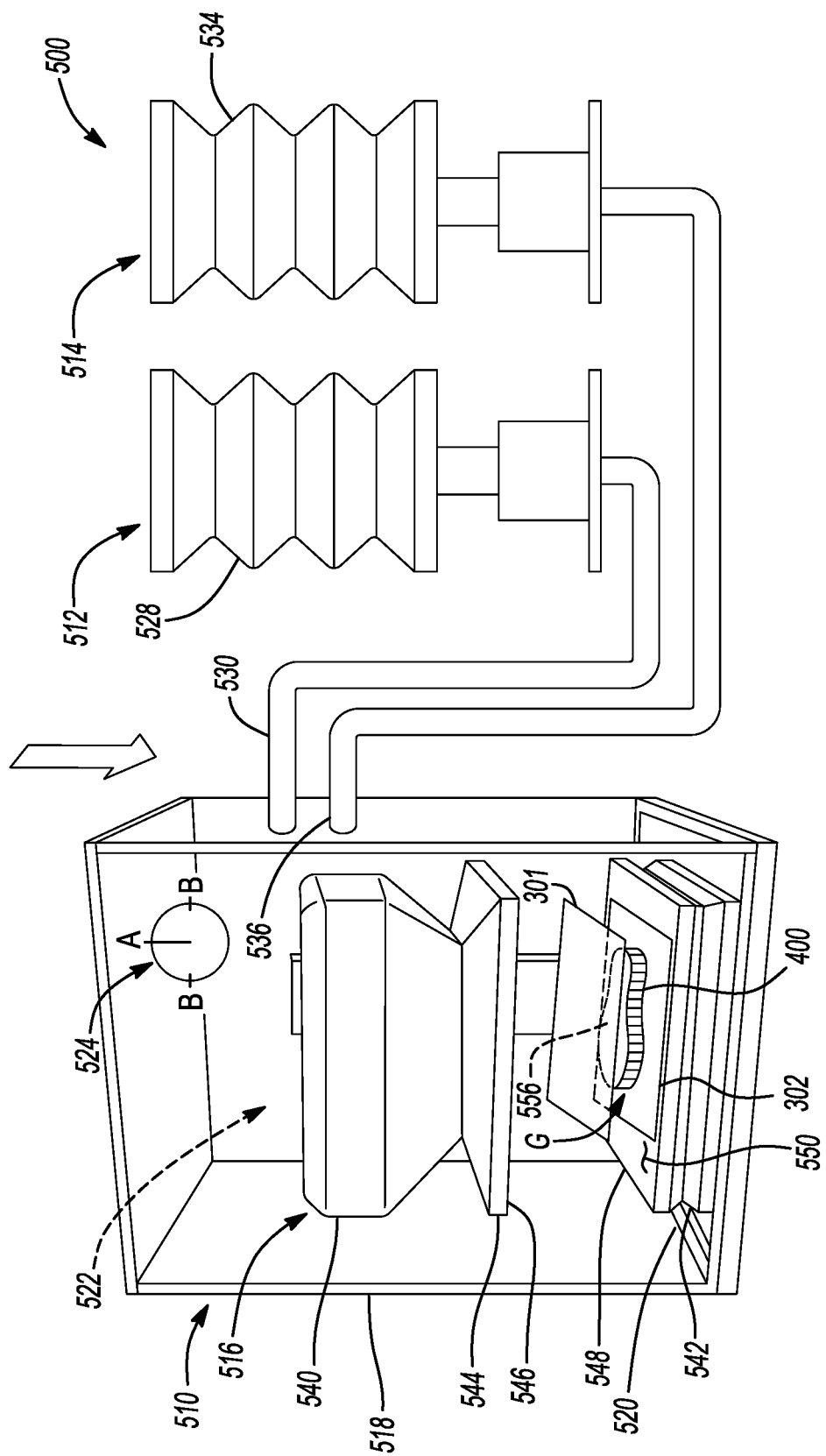
FIG. 5C is a perspective view of the system of FIG. 3 in a third mode of operation.

FIG. 5C shows the system 500 in a third mode of operation, during which (i) the upper portion 518 of the housing 510 is in a closed position relative to the lower portion 520 of the housing 510, and (ii) the upper platen 544 of the press 516 is in the open position relative to the lower platen 548 of the press 516. In particular, the upper portion 518 of the housing 510 may be sealed relative to the lower portion 520 of the housing 510 such that the housing 510 is sealed and the fluid within the chamber 522 is sealed relative to the fluid surrounding the chamber 522.

Figure 5D:
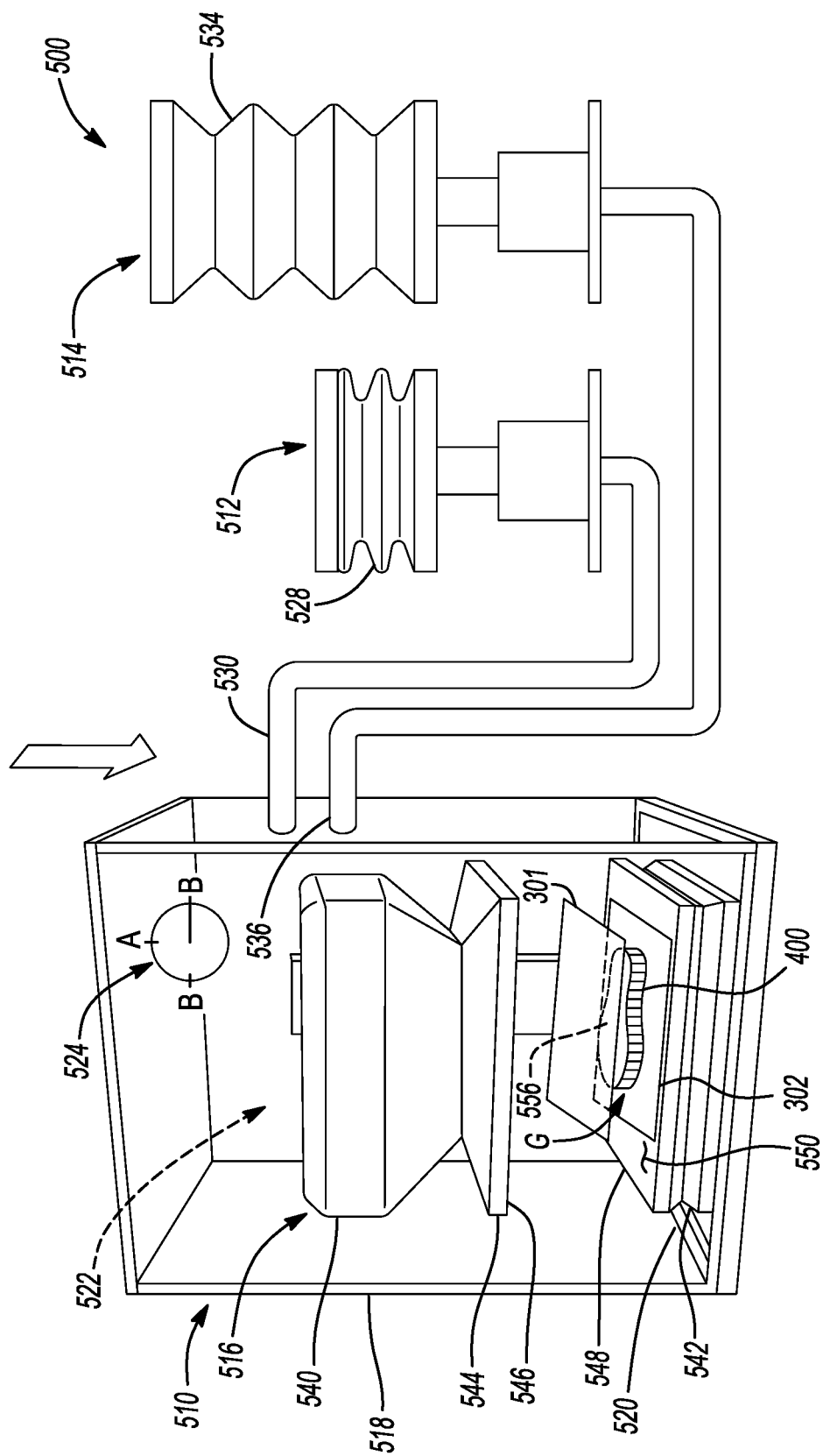
FIG. 5D is a perspective view of the system of FIG. 3 in a fourth mode of operation.

FIG. 5D shows the system 500 in a fourth mode of operation, during which fluid is supplied to the chamber 522 from the first fluid supply system 512 or the second fluid supply system 514. For example, fluid may be delivered to the chamber 522 from the first fluid source 528 via a bellows or other fluid-supply device. Accordingly, during the fourth mode of operation, the value of the pressure of the fluid within the chamber 522 and within the gap G formed between the polymer sheets 301 and 302 may be greater than the value of the pressure of the fluid outside the chamber 522. In this regard, the pressure gauge 524 may measure the pressure of the fluid inside the chamber 522 to be greater than the atmospheric pressure of the atmosphere surrounding the housing 510. For example, the pressure within the chamber 522 may be between 2.0 atm and 5.0 atm. In some implementations, the pressure within the chamber 522 may be substantially equal to 2.6 atm.

Figure 5E:
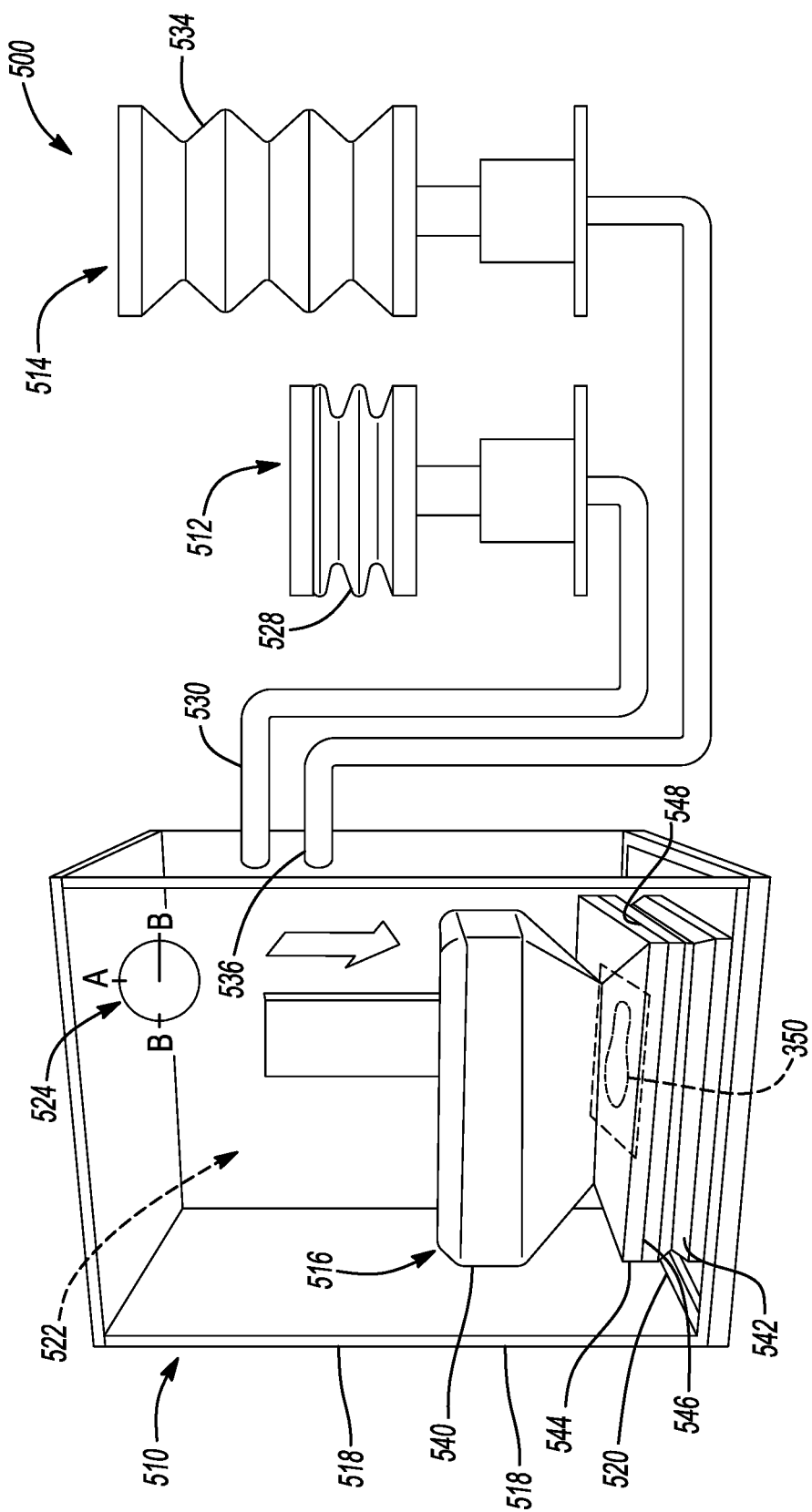
FIG. 5E is a perspective view of the system of FIG. 3 in a fifth mode of operation.

FIG. 5E shows the system 500 in a fifth mode of operation, during which (i) the upper portion 518 of the housing 510 is in the closed position relative to the lower portion 520 of the housing 510, and (ii) the upper platen 544 of the press 516 is in a closed position relative to the lower platen 548 of the press 516. During the fifth mode of operation, the first polymer sheet 301 may be secured to the second polymer sheet 302 at the peripheral bond 350 by heating, ultrasonically or RF welding, or otherwise applying an adhesive to the first polymer sheet 301 or the second polymer sheet 302, as previously described, such that the first polymer sheet 301 is melted, melded, bonded, adhered or otherwise secured or connected to the second polymer sheet 302 in a substantially airtight or sealed manner. In this regard, during the fifth mode of operation, the fluid delivered to the chamber 522 during the fourth mode of operation may be sealed within the gap G during the fifth mode of operation to form a fluid-filled chamber (e.g., fluid-filled chamber 300). Accordingly, the value of the pressure of the fluid within the chamber 522 and the gap G during the fifth mode of operation may be substantially equal to the value of the pressure of the fluid within the chamber and the gap G during the fourth mode of operation. In particular, the value of the pressure within the chamber 522 and the gap G during the fifth mode of operation may be greater than the value of the atmospheric pressure of the atmosphere surrounding the housing 510.

Figure 5F:
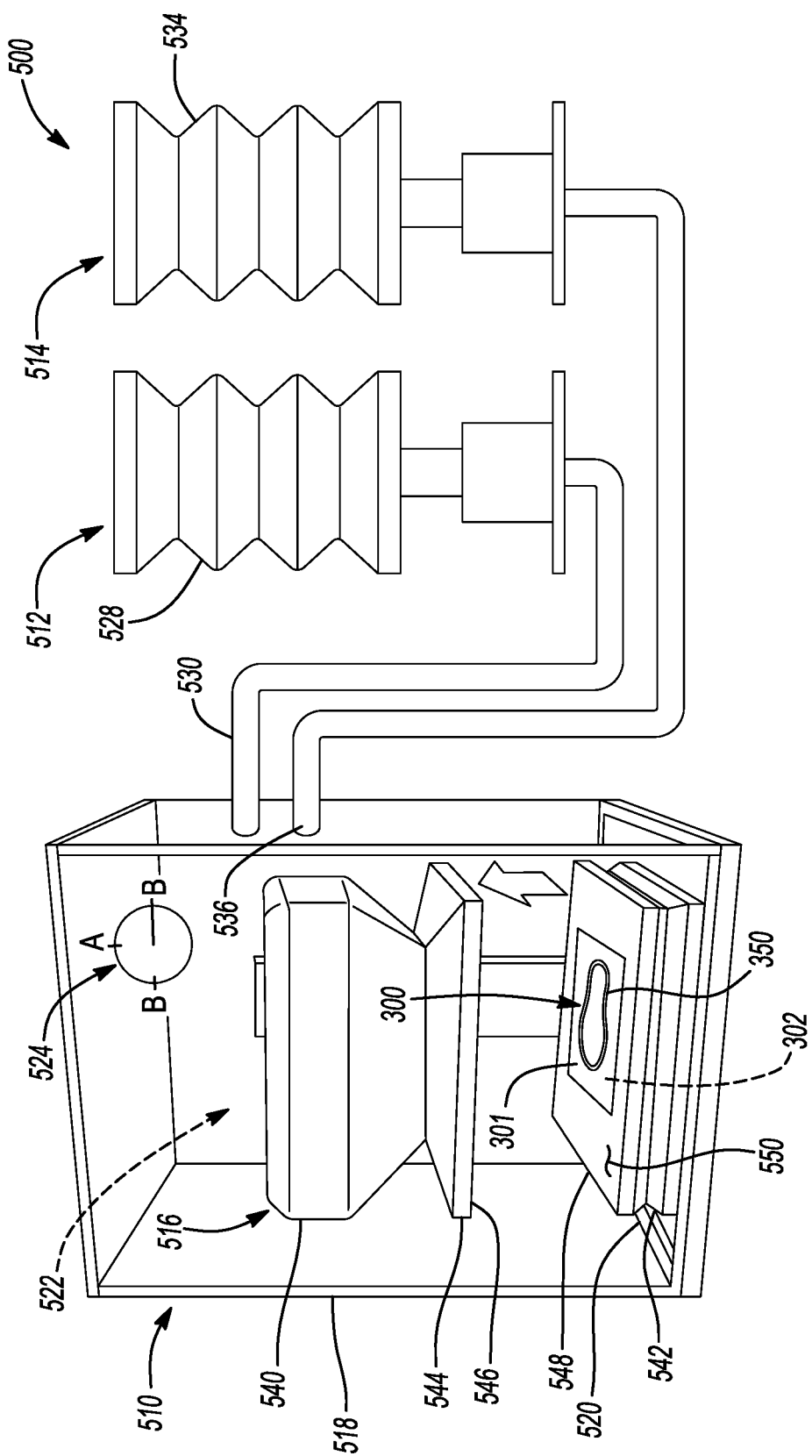
FIG. 5F is a perspective view of the system of FIG. 3 in a sixth mode of operation.

FIG. 5F shows the system 500 in a sixth mode of operation, during which (i) the upper portion 518 of the housing 510 is in the closed position relative to the lower portion 520 of the housing 510, and (ii) the upper platen 544 of the press 516 is in the open position relative to the lower platen 548 of the press 516. During the sixth mode of operation, the pressure gauge 524 may measure the pressure of the fluid inside the chamber 522 to be greater than the atmospheric pressure of the atmosphere surrounding the housing 510.

Figure 5G:
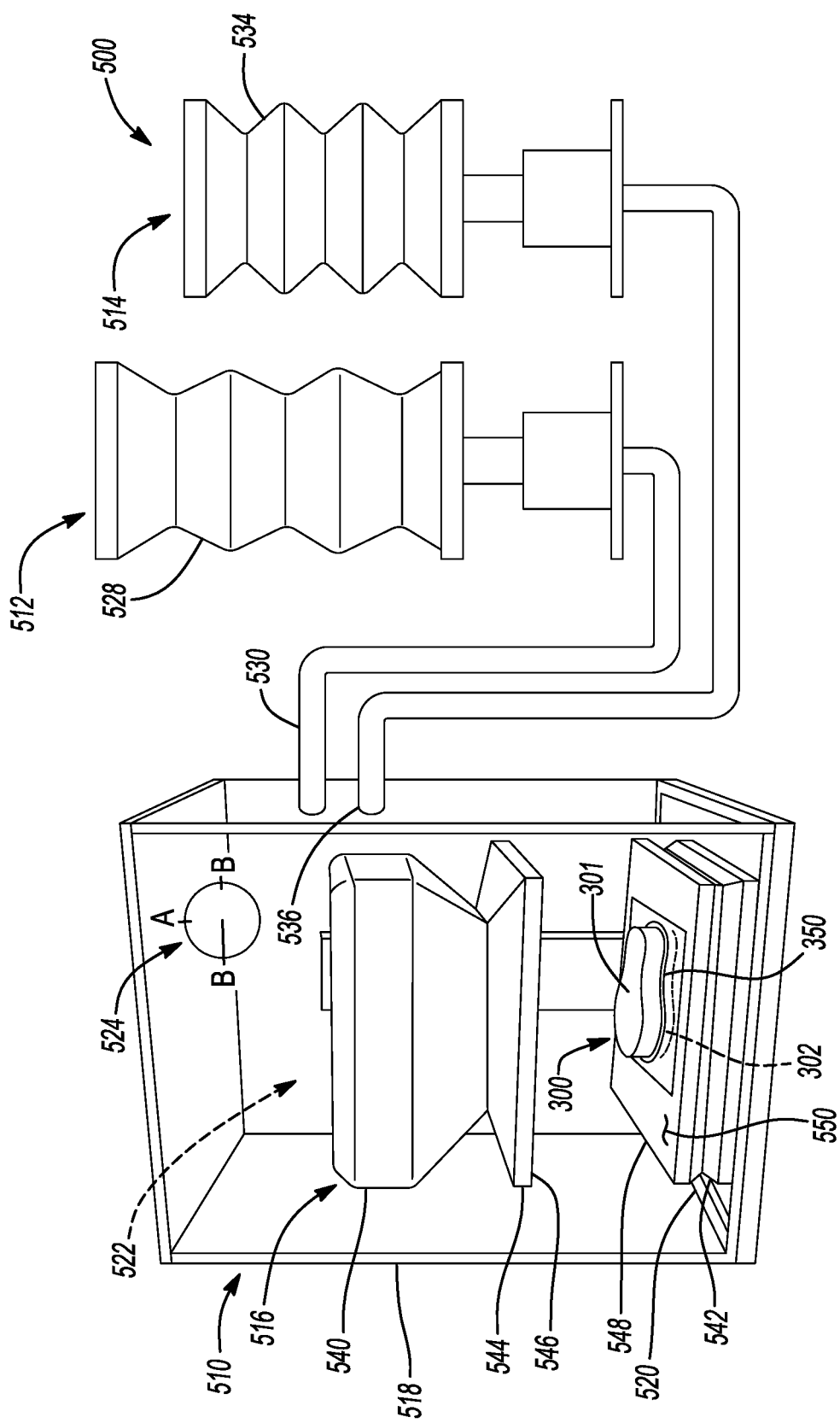
FIG. 5G is a perspective view of the system of FIG. 3 in a seventh mode of operation.

FIG. 5G shows the system in a seventh mode of operation, during which fluid may be released from the chamber 522. For example, in some implementations, fluid is supplied from the chamber 522 to one of the first fluid supply system 512 and the second fluid supply system 514. For example, fluid may be delivered to the first fluid source 528 via a bellows or other fluid-supply device from the chamber 522. In other implementations, fluid is supplied from the chamber 522 to the atmosphere surrounding the chamber 522. Accordingly, during the seventh mode of operation, the value of the pressure of the fluid within the chamber 522 may be less than or equal to the value of the pressure of the fluid outside the chamber 522, while the value of the pressure of the fluid within the gap G (e.g., within the fluid-filled chamber 300) may be greater than the value of the pressure of the fluid within the chamber 522 and the value of the pressure of the fluid outside the chamber 522. In some implementations, the pressure gauge 524 may measure the pressure of the fluid inside the chamber 522 to be equal to the atmospheric pressure of the atmosphere surrounding the housing 510.

In some implementations, during the seventh mode of operation, a negative pressure (e.g., a vacuum) may be applied to the chamber 522. For example, during the seventh mode of operation, the first fluid supply system 512 or the second fluid supply system 514 may apply a vacuum to the chamber 522. In particular, the bellows of the first fluid source 528 may apply a vacuum to the chamber 522 such that the value of the pressure of the fluid inside the chamber 522 is less than the value of the atmospheric pressure of the atmosphere surrounding the housing 510. For example, the pressure within the chamber 522 may be between 0.7 atm and 0.9 atm. In some implementations, the pressure within the chamber 522 may be substantially equal to 0.8 atm. Accordingly, the value of the pressure of the fluid within the fluid-filled chamber 300 and the value of the pressure of the fluid within the chamber 522 may cause the size of the fluid-filled chamber 300 to increase based on equation (1):

$$P_1 V_1 = P_2 V_2 \qquad (1)$$

where $P_1$ and $V_1$ are the pressure and volume, respectively, of the fluid-filled chamber 300 during the fifth mode of operation, and $P_2$ and $V_2$ are the pressure and volume, respectively, of the fluid-filled chamber 300 during the sixth mode of operation.

As the pressure in the chamber 522 is reduced during the seventh mode of operation, the pressure of the fluid within the fluid-filled chamber 300 may increase the volume of the fluid-filled chamber 300 and stretch the first and second polymer sheets 301, 302, thereby proportionately reducing the pressure of the fluid within the fluid-filled chamber 300. In some implementations, the volume of the fluid-filled chamber 300 may increase until the first and second polymer sheets 301, 302 have stretched to their elastic limit and are limited from further expansion by the tensile element 400 if present. For example, the volume of the fluid-filled chamber 300 may increase such that the volume $V_2$ is between 110% and 150% of the volume $V_1$. In some implementations, the volume $V_2$ is 125% of the volume $V_1$. If the tensile element 400 is present, the tensile element 400 does not need to be "shocked" before being inserted between the sheets 301, 302, as is often necessary during construction of a conventional fluid-filled chamber containing a tensile element due to the automatic expansion of the fluid-filled chamber 300 in response to the reduction of pressure acting on the fluid-filled chamber 300 when the pressure in the chamber 522 is reduced. Namely, the fibers or tensile elements 430 of the tensile element 400 do not need to be stretched or placed under tension prior to inflation of the fluid-filled chamber 300 (i.e., "shocked"), as the tensile elements 430 are automatically stretched and placed under tension when the pressure within the chamber 522 is reduced, as this expansion is rapid enough to obviate the need to first shock the fibers 430.

Figure 5H:
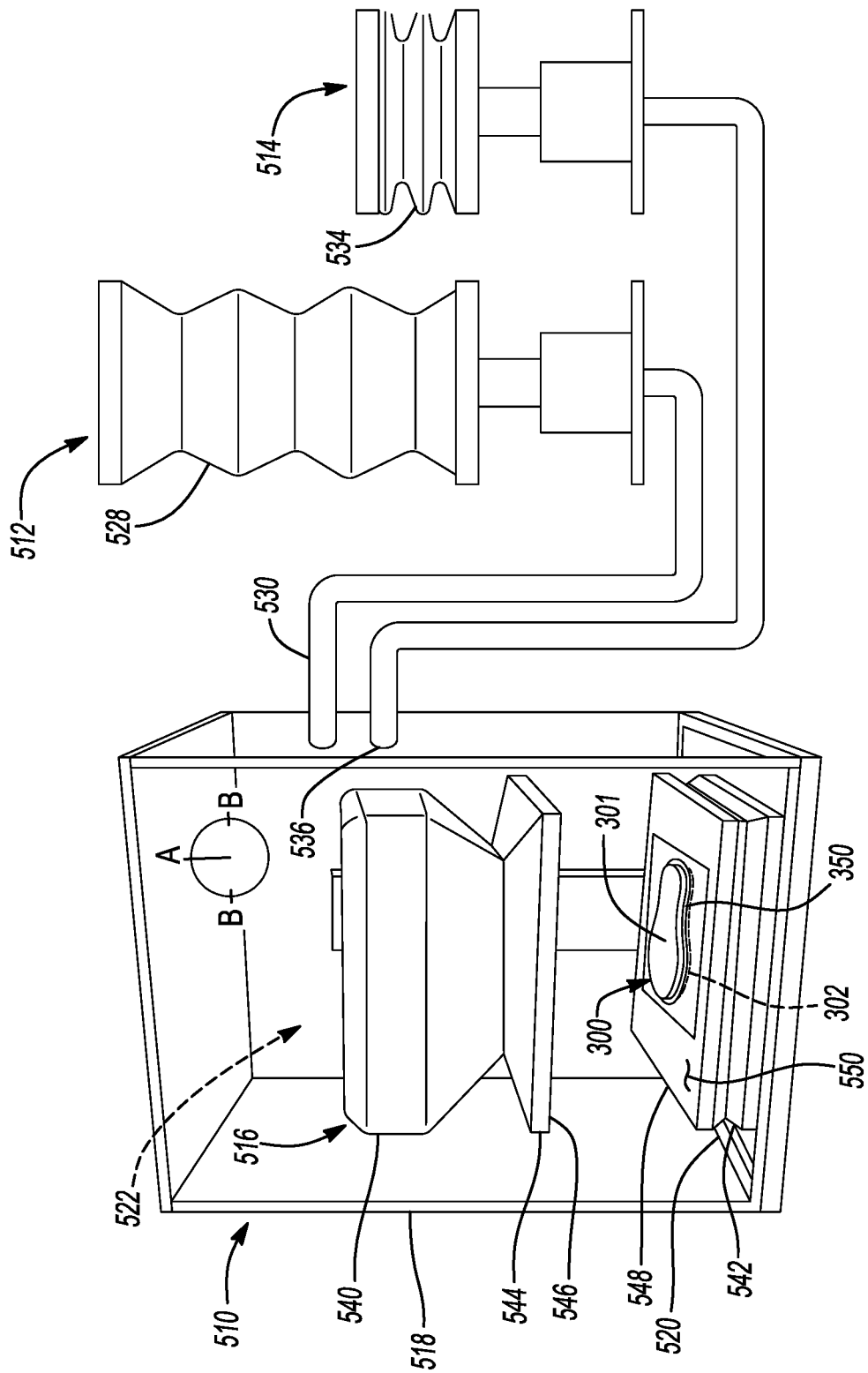
FIG. 5H is a perspective view of the system of FIG. 3 in an eighth mode of operation.

FIG. 5H shows the system 500 in an eighth mode of operation, during which (i) the upper portion 518 of the housing 510 may be in the closed position relative to the lower portion 520 of the housing 510, and (ii) the upper platen 544 of the press 516 is in the open position relative to the lower platen 548 of the press 516. During the eighth mode of operation, fluid may be supplied to the chamber 522 from the atmosphere or from one of the first fluid supply system 512 or the second fluid supply system 514. For example, fluid may be delivered to the chamber 522 from the second fluid source 534 via a bellows or other fluid-supply device. Accordingly, during the eighth mode of operation, the value of the pressure of the fluid within the chamber 522 may increase. In some implementations, fluid is delivered to the chamber 522 from the atmosphere surrounding the chamber 522. Accordingly, the value of the pressure of the fluid within the chamber 522 may equal the value of the atmospheric pressure of the atmosphere surrounding the housing 510. In this regard, the pressure gauge 524 may measure the pressure of the fluid inside the chamber 522 to be equal to the atmospheric pressure of the atmosphere surrounding the housing 510. For example, the pressure within the chamber 522 may be between 0.9 atm and 1.5 atm. In some implementations, the pressure within the chamber 522 may be substantially equal to 1.0 atm.

As the value of the pressure within the chamber 522 increases during the eighth mode of operation, the value of the pressure of the fluid within the fluid-filled chamber 300 and the value of the pressure of the fluid within the chamber 522 may cause the size of the fluid-filled chamber 300 to decrease based on equation (1). Namely, as the pressure in the chamber 522 increases during the eighth mode of operation, the volume of the fluid-filled chamber 300 may be reduced, thereby proportionately increasing the pressure of the fluid within the fluid-filled chamber 300. In this regard, the pressure of the fluid within the fluid-filled chamber 300 may increase until the atmospheric pressure of the atmosphere surrounding the fluid-filled chamber 300 is equal to the value of the pressure within the fluid-filled chamber 300.

Figure 5I:
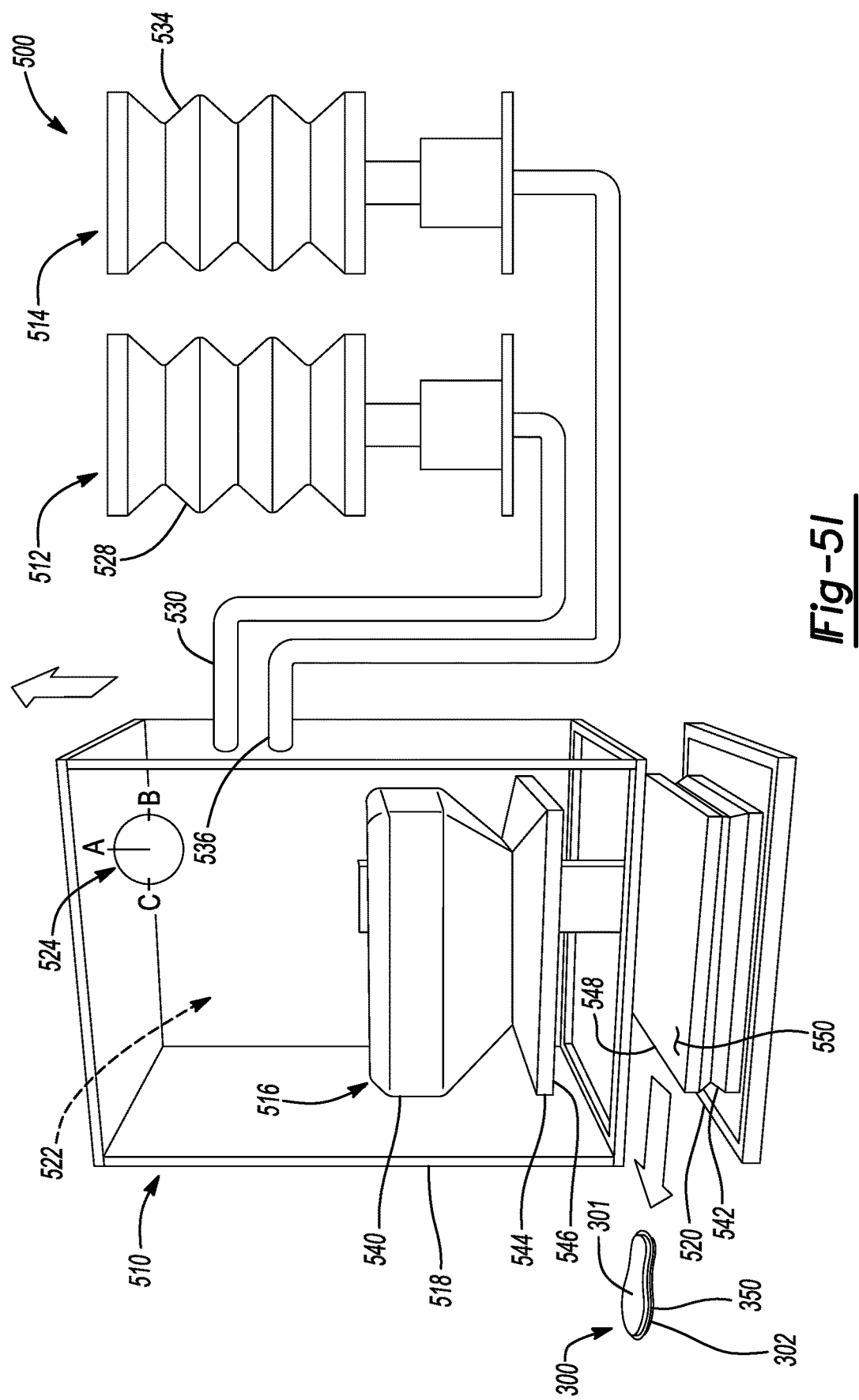
FIG. 5I is a perspective view of the system of FIG. 3 in a ninth mode of operation.

FIG. 5I shows the system 500 in a ninth mode of operation, during which (i) the upper portion 518 of the housing 510 may be in the open position relative to the lower portion 520 of the housing 510, and (ii) the upper platen 544 of the press 516 is in the open position relative to the lower platen 548 of the press 516. During the ninth mode of operation, the fluid-filled chamber 300 may exit the housing 510 for assembly in an article of footwear (e.g., footwear 10) or other article of manufacture.

Figure 6:
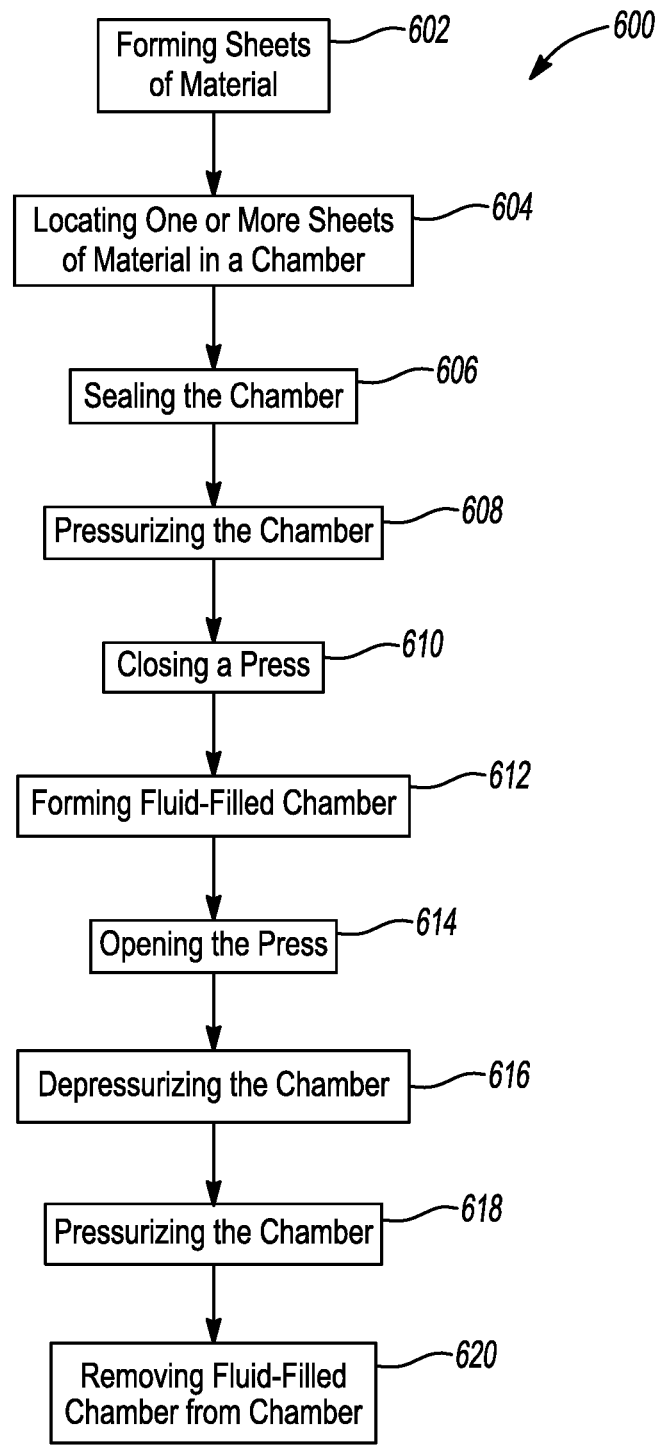
FIG. 6 is a flow chart illustrating a method of manufacturing a fluid-filled chamber in accordance with the principles of the present disclosure.

With reference to FIG. 6, a method of forming a fluid-filled chamber (e.g., chamber 300, chamber 500) begins at 600. At step 602, the method may include forming one or more sheets (e.g., sheet 301, sheet 302) of material. In some implementations, the sheets are formed in a lamination process. In particular, the sheets may be formed in a lamination welding process in which layers of material (e.g., TPU, or other polymer) are laminated to one another in an ultrasonic, RF, or other suitable welding process.

At step 604, the method may include locating one or more sheets (e.g., sheet 301, sheet 302) of material in a chamber (e.g., chamber 522). For example, the sheets 301, 302 may be transferred or otherwise moved between upper and lower platens (e.g., upper and lower platens 544, 548) of a press (e.g., press 516). In some implementations, a first polymer sheet (e.g., first polymer sheet 301) is positioned on or adjacent to an upper surface (e.g., second surface 550) of a lower platen, (iv) a second polymer sheet (e.g., second polymer sheet 302) is positioned on or adjacent to the first polymer sheet, and (v) a tensile element (e.g., tensile element 400) is disposed between the first polymer sheet and the second polymer sheet.

At step 606, the method may include sealing the chamber. For example, the method may include closing a first portion (e.g., upper portion 518) of a housing (e.g., housing 510) relative to a second portion (e.g., lower portion 520) of the housing. In particular, at step 606, the first portion of the housing may be sealed relative to the second portion of the housing such that the housing is sealed and the fluid within the chamber is sealed relative to the fluid surrounding the chamber.

At step 608, the method may include supplying a fluid (e.g., nitrogen gas) to the chamber from a fluid supply system (e.g., first fluid supply system 512 or second fluid supply system 514). For example, fluid may be delivered to the chamber from a first fluid source (e.g., first fluid source 528) via a bellows or other fluid-supply device. Accordingly, at step 608, the method may include increasing the fluid pressure within the chamber and within a gap (e.g., gap G) formed between the sheets. In particular, the fluid pressure within the chamber and the gap between the sheets at step 608 may be greater than the fluid pressure outside the chamber. For example, the pressure within the chamber at step 608 may be between 2.0 atm and 5.0 atm. In some implementations, the pressure within the chamber may be substantially equal to 2.6 atm at step 608.

At step 610, the method may include closing one of the upper or lower platen of the press relative to the lower platen of the press. In some implementations, the upper platen is closed relative to the other of the upper or lower platen such that fluid communication between the chamber and the gap formed between the sheets of material is prevented.

At step 612, the method may include forming a fluid-filled chamber (e.g., fluid-filled chamber 300). For example, the method may include securing the first sheet of material to the second sheet of material at a peripheral bond (e.g., peripheral bond 350) by heating, ultrasonically or RF welding, or otherwise applying an adhesive to the first sheet of material or the second sheet of material, as previously described, such that the first sheet of material is melted, melded, bonded, adhered or otherwise secured or connected to the second sheet of material in a substantially airtight or sealed manner. In this regard, at step 612, the fluid delivered to the chamber at step 608 may be sealed within the gap formed between the sheets of material to define a fluid-filled chamber. The value of the pressure within the chamber and the gap during step 612 may be greater than the value of the atmospheric pressure of the atmosphere surrounding the housing.

At step 614, the method may include opening one of the upper or lower platen of the press relative to the other of the upper or lower platen of the press. In some implementations, the upper platen is opened relative to the lower platen.

At step 616, the method may include reducing a pressure within the chamber. For example, the method may include supplying, or otherwise releasing, a fluid from the chamber to one or more of the first fluid supply system, the second fluid supply system, or the atmosphere surrounding the chamber. In some implementations, fluid is supplied from the chamber to the first fluid supply system. For example, fluid may be delivered to the first fluid source via a bellows or other fluid-supply device from the chamber. Alternatively, or in addition thereto, fluid may be released from the chamber to the atmosphere surrounding the chamber. Accordingly, during step 616, the fluid pressure within the chamber may be less than or equal to the fluid pressure outside the chamber, while the fluid pressure within the fluid-filled chamber formed by the sheets of material may be greater than the fluid pressure within the chamber and the fluid pressure outside the chamber. In this regard, during step 616, the pressure gauge may measure the fluid pressure inside the chamber to be less than or equal to the atmospheric pressure of the atmosphere surrounding the housing.

In some implementations, during step 616, a negative pressure (e.g., a vacuum) may be applied to the chamber. For example, the first fluid supply system or the second fluid supply system may apply a vacuum to the chamber such that the fluid pressure inside the chamber is less than the atmospheric pressure of the atmosphere surrounding the housing 510. Accordingly, during step 616, the value of the pressure of the fluid within the fluid-filled chamber defined by the sheets of material may cause the volume of the fluid-filled chamber to increase based on equation (1), where $P_1$ and $V_1$ are the pressure and volume, respectively, of the fluid-filled chamber during step 612, and $P_2$ and $V_2$ are the pressure and volume, respectively, of the fluid-filled chamber during step 616. As the pressure in the chamber decreases during step 616, the pressure of the fluid within the fluid-filled chamber may increase the volume of the fluid-filled chamber and stretch the sheets of material, thereby proportionately reducing the pressure of the fluid within the fluid-filled chamber, thereby shocking the sheets of material.

At step 618, the method may include supplying fluid to the chamber from the atmosphere or from one of the first fluid supply system or the second fluid supply system. For example, fluid may be delivered to the chamber from the second fluid source via a bellows or other fluid-supply device. Accordingly, during step 618, the fluid pressure within the chamber may increase. In some implementations, fluid is delivered to the chamber from the atmosphere surrounding the chamber during step 618. Accordingly, during step 618, the fluid pressure within the chamber may equal the atmospheric pressure of the atmosphere surrounding the housing. In this regard, the pressure gauge may measure the pressure of the fluid inside the chamber to be equal to the atmospheric pressure of the atmosphere surrounding the housing.

As the value of the pressure within the chamber increases during step 618, the value of the pressure of the fluid within the fluid-filled chamber and the value of the pressure of the fluid within the chamber may cause the volume of the gap fluid-filled chamber to decrease based on equation (1). Namely, as the pressure in the chamber increases during step 618, the volume of the fluid-filled chamber may be reduced, thereby proportionately increasing the pressure of the fluid within the fluid-filled chamber. In this regard, the pressure of the fluid within the fluid-filled chamber may increase until the atmospheric pressure of the atmosphere surrounding the fluid-filled chamber is equal to the value of the pressure within the fluid-filled chamber.

At step 620, the method may include removing the fluid-filled chamber from the chamber. For example, the method may include removing the fluid-filled chamber from the chamber for assembly in an article of footwear (e.g., footwear 10) or other article of manufacture.

The following Clauses provide an exemplary configuration for a method of forming a fluid-filled chamber for an article of footwear described above.

Clause 1: A method of forming a fluid-filled chamber for an article of footwear, the method comprising positioning a first sheet of material and a second sheet of material in a pressure chamber, increasing a fluid pressure within the pressure chamber to a first value, coupling the first sheet of material to the second sheet of material within the pressure chamber to define a fluid-filled chamber defined by the first sheet of material and the second sheet of material and having a fluid pressure equal to the first value, and decreasing the fluid pressure within the pressure chamber to a second value.

Clause 2: The method of Clause 1, wherein the coupling step occurs after the increasing step, and the decreasing step occurs after the coupling step.

Clause 3: The method of Clause 1, wherein coupling the first sheet of material to the second sheet of material includes ultrasonically welding the first sheet of material to the second sheet of material.

Clause 4: The method of Clause 1, wherein decreasing the fluid pressure within the pressure chamber to a second value includes applying a vacuum to the pressure chamber.

Clause 5: The method of Clause 1, wherein the second value is less than a value of the fluid pressure of the atmosphere surrounding the pressure chamber.

Clause 6: The method of Clause 1, wherein the first value is between 2.0 atm and 5.0 atm.

Clause 7: The method of Clause 6, wherein the first value is equal to 2.6 atm.

Clause 8: The method of Clause 6, wherein the second value is between 0.7 atm and 0.9 atm.

Clause 9: The method of Clause 8, wherein the second value is equal to 0.8 atm.

Clause 10: The method of Clause 1, wherein positioning a first sheet of material in the pressure chamber includes positioning a sheet of material formed from a polymer.

Clause 11: The method of Clause 10, wherein positioning a first sheet of material formed from a polymer includes positioning a sheet of material formed from thermoplastic polyurethane.

Clause 12: The method of Clause 10, wherein positioning a second sheet of material in the pressure chamber includes positioning a sheet of material formed from a polymer.

Clause 13: The method of Clause 12, wherein positioning a second sheet of material formed from a polymer includes positioning a sheet of material formed from thermoplastic polyurethane.

Clause 14: The method of Clause 1, wherein increasing the fluid pressure within the pressure chamber includes supplying a first fluid to the pressure chamber from a first fluid source.

Clause 15: The method of Clause 14, wherein supplying a first fluid to the pressure chamber includes supplying nitrogen.

Clause 16: The method of Clause 14, wherein decreasing the fluid pressure within the pressure chamber includes removing the first fluid from the pressure chamber with the first fluid source.

Clause 17: The method of Clause 14, wherein removing the first fluid from the pressure chamber with the first fluid source includes directing the removed first fluid to a bellows of the first fluid source.

Clause 18: The method of Clause 1, further comprising increasing the fluid pressure within the pressure chamber to a third value after decreasing the fluid pressure within the pressure chamber to the second value.

Clause 19: The method of Clause 18, wherein the third value is less than or equal to a value of the fluid pressure of the atmosphere surrounding the pressure chamber.

Clause 20: The method of Clause 18, wherein the third value is between 0.9 atm and 1.5 atm.

Clause 21: The method of Clause 20, wherein the third value is equal to 1.0 atm.

Clause 22: The method of Clause 18, wherein increasing the fluid pressure within the pressure chamber to the third value includes supplying a second fluid to the pressure chamber from a second fluid source.

Clause 23: The method of Clause 22, wherein supplying a second fluid to the pressure chamber from a second fluid source includes supplying air.

Clause 24: The method of Clause 22, wherein supplying a second fluid to the pressure chamber from a second fluid source includes supplying fluid from the atmosphere surrounding the pressure chamber.

Clause 25: The method of Clause 22, further comprising providing the second fluid source with a bellows.

Clause 26: The method of Clause 18, wherein increasing the fluid pressure within the pressure chamber to the third value includes exposing the fluid within the pressure chamber to the atmosphere surrounding the pressure chamber.

Clause 27: A method of forming a fluid-filled chamber for an article of footwear, the method comprising positioning a first sheet of material in a pressure chamber, pressurizing the pressure chamber to a fluid pressure equal to a first value, forming a fluid-filled chamber from the first sheet of material, the fluid-filled chamber having a fluid pressure equal to the first value, and depressurizing the chamber to reduce the fluid pressure within the pressure chamber to a second value.

Clause 28: The method of Clause 27, further comprising positioning a second sheet of material in the pressure chamber, wherein forming the fluid-filled chamber from the first sheet of material includes coupling the first sheet of material to the second sheet of material, the first sheet of material and the second sheet of material collectively defining the fluid-filled chamber.

Clause 29: The method of Clause 28, wherein forming the fluid-filled chamber includes ultrasonically welding the first sheet of material to the second sheet of material.

Clause 30: The method of Clause 27, wherein the forming step occurs after the pressurizing step, and the depressurizing step occurs after the forming step.

Clause 31: The method of Clause 27, wherein forming the fluid-filled chamber includes ultrasonically welding a first portion of the first sheet of material to a second portion of the first sheet of material.

Clause 32: The method of Clause 27, wherein depressurizing the pressure chamber includes applying a vacuum to the pressure chamber.

Clause 33: The method of Clause 27, wherein the second value is less than a value of the fluid pressure of the atmosphere surrounding the pressure chamber.

Clause 34: The method of Clause 27, wherein the first value is between 2.0 atm and 5.0 atm.

Clause 35: The method of Clause 34, wherein the first value is equal to 2.6 atm.

Clause 36: The method of Clause 34, wherein the second value is between 0.7 atm and 0.9 atm.

Clause 37: The method of Clause 36, wherein the second value is equal to 0.8 atm.

Clause 38: The method of Clause 27, wherein positioning a first sheet of material in the pressure chamber includes positioning a sheet of material formed from a polymer.

Clause 39: The method of Clause 38, wherein positioning a first sheet of material formed from a polymer includes positioning a sheet of material formed from thermoplastic polyurethane.

Clause 40: The method of Clause 27, wherein pressurizing the pressure chamber includes supplying a first fluid to the pressure chamber from a first fluid source.

Clause 41: The method of Clause 40, wherein supplying a first fluid to the pressure chamber includes supplying nitrogen.

Clause 42: The method of Clause 40, wherein depressurizing the pressure chamber includes removing the first fluid from the pressure chamber with the first fluid source.

Clause 43: The method of Clause 40, wherein removing the first fluid from the pressure chamber with the first fluid source includes directing the removed first fluid to a bellows of the first fluid source.

Clause 44: The method of Clause 27, further comprising pressurizing the pressure chamber such that the fluid pressure within the pressure chamber is equal to a third value after depressurizing the pressure chamber.

Clause 45: The method of Clause 44, wherein the third value is less than or equal to a value of the fluid pressure of the atmosphere surrounding the pressure chamber.

Clause 46: The method of Clause 44, wherein the third value is between 0.9 atm and 1.5 atm.

Clause 47: The method of Clause 46, wherein the third value is equal to 1.0 atm.

Clause 48: The method of Clause 44, wherein pressurizing the pressure chamber includes supplying a second fluid to the pressure chamber from a second fluid source.

Clause 49: The method of Clause 48, wherein supplying a second fluid to the pressure chamber from a second fluid source includes supplying air.

Clause 50: The method of Clause 48, wherein supplying a second fluid to the pressure chamber from a second fluid source includes supplying fluid from the atmosphere surrounding the pressure chamber Clause 51: The method of Clause 48, further comprising providing the second fluid source with a bellows.

Clause 52: The method of Clause 44, wherein pressurizing the pressure chamber includes exposing the fluid within the pressure chamber to the atmosphere surrounding the pressure chamber.

Clause 53: A method of forming a fluid-filled chamber for an article of footwear, the method comprising positioning a sheet of material in a pressure chamber, pressurizing the pressure chamber to a first pressure value, coupling a first portion of the sheet of material to a second portion of the sheet of material to define a fluid-filled chamber having a second pressure value, depressurizing the pressure chamber to a third pressure value less than the first pressure value, and increasing the volume of the fluid-filled chamber.

Clause 54: The method of Clause 53, wherein the second pressure value is equal to the first pressure value.

Clause 55: The method of Clause 53, wherein increasing the volume of the fluid-filled chamber includes reducing the second pressure value.

Clause 56: The method of Clause 53, wherein pressurizing the pressure chamber to the first pressure includes supplying a first fluid to the pressure chamber.

Clause 57: The method of Clause 53, wherein the third pressure value is less than a pressure value of the atmosphere surrounding the pressure chamber.

Clause 58: The method of Clause 53, further comprising depressurizing the pressure chamber to a fourth pressure value greater than the third pressure value and less than the first pressure value.

Clause 59: The method of Clause 53, wherein coupling the first portion of the sheet of material to the second portion of the sheet of material includes ultrasonically welding the first portion of the sheet of material to the second portion of the sheet of material.

Clause 60: A system for forming a fluid-filled chamber for an article of footwear, the system comprising a pressure chamber having a volume of fluid, a welding device disposed within the chamber, and a first fluid source in fluid communication with the pressure chamber and operable to supply a first fluid to the volume and to increase the fluid pressure of the volume.

Clause 61: The system of Clause 60, wherein the first fluid source includes a bellows.

Clause 62: The system of Clause 60, wherein the first fluid source is operable to remove the first fluid from the volume and to decrease the fluid pressure of the volume.

Clause 63: The system of Clause 60, further comprising a second fluid source in fluid communication with the pressure chamber and operable to supply a second fluid to the volume and to increase the fluid pressure of the volume.

Clause 64: The system of Clause 63, wherein the second fluid source includes a bellows.

Clause 65: The system of Clause 63, wherein the first fluid is nitrogen and the second fluid is air.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method of forming a fluid-filled chamber for an article of footwear, the method comprising:
    positioning a first sheet of material and a second sheet of material in a pressure chamber;
    increasing a fluid pressure within the pressure chamber to a first value;
    applying pressure at the first value to both sides of a least one of the first sheet of material and the second sheet of material within the pressure chamber;
    coupling the first sheet of material to the second sheet of material within the pressure chamber to define a fluid-filled chamber defined by the first sheet of material and the second sheet of material and having a fluid pressure equal to the first value; and
    decreasing the fluid pressure within the pressure chamber to a second value.

2. The method of claim 1, wherein the coupling step occurs after the increasing step, and the decreasing step occurs after the coupling step.

3. The method of claim 1, wherein coupling the first sheet of material to the second sheet of material includes ultrasonically welding the first sheet of material to the second sheet of material.

4. The method of claim 1, wherein decreasing the fluid pressure within the pressure chamber to a second value includes applying a vacuum to the pressure chamber.

5. The method of claim 1, wherein the second value is less than a value of the fluid pressure of the atmosphere surrounding the pressure chamber.

6. The method of claim 1, wherein the first value is between 2.0 atm and 5.0 atm.

7. The method of claim 6, wherein the second value is between 0.7 atm and 0.9 atm.

8. The method of claim 1, wherein positioning a first sheet of material in the pressure chamber and positioning a second sheet of material in the pressure chamber includes positioning at least one sheet of material formed from a polymer.

9. The method of claim 1, wherein supplying a first fluid to the pressure chamber includes supplying nitrogen.

10. The method of claim 1, further comprising removing fluid from the pressure chamber with a first fluid source and directing the removed fluid to a bellows of the first fluid source.

11. A method of forming a fluid-filled chamber for an article of footwear, the method comprising:
    positioning a first sheet of material in a pressure chamber;
    pressurizing the pressure chamber to a fluid pressure equal to a first value;
    applying pressure at the first value to both sides of the first sheet of material within the pressure chamber;
    forming a fluid-filled chamber from the first sheet of material, the fluid-filled chamber having a fluid pressure equal to the first value; and
    depressurizing the pressure chamber to reduce the fluid pressure within the pressure chamber to a second value.

12. The method of claim 11, further comprising positioning a second sheet of material in the pressure chamber, wherein forming the fluid-filled chamber from the first sheet of material includes coupling the first sheet of material to the second sheet of material, the first sheet of material and the second sheet of material collectively defining the fluid-filled chamber.

13. The method of claim 12, wherein forming the fluid-filled chamber includes ultrasonically welding the first sheet of material to the second sheet of material.

14. The method of claim 11, wherein the forming step occurs after the pressurizing step, and the depressurizing step occurs after the forming step.

15. The method of claim 11, wherein forming the fluid-filled chamber includes ultrasonically welding a first portion of the first sheet of material to a second portion of the first sheet of material.

16. The method of claim 11, wherein the first value is between 2.0 atm and 5.0 atm.

17. The method of claim 16, wherein the second value is between 0.7 atm and 0.9 atm.

18. The method of claim 11, wherein positioning a first sheet of material in the pressure chamber includes positioning a sheet of material formed from a polymer.

19. The method of claim 11, wherein supplying a first fluid to the pressure chamber includes supplying nitrogen.

20. The method of claim 11, further comprising removing fluid from the pressure chamber with a first fluid source and directing the removed fluid to a bellows of the first fluid source.

\* \* \* \* \*